(12) United States Patent
Long, III

(10) Patent No.: US 10,605,059 B2
(45) Date of Patent: Mar. 31, 2020

(54) PVDF PIPE AND METHODS OF MAKING AND USING SAME

(71) Applicant: Chevron Phillips Chemical Company LP, The Woodlands, TX (US)

(72) Inventor: Harold W. Long, III, The Woodlands, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 16/223,821

(22) Filed: Dec. 18, 2018

(65) Prior Publication Data

US 2019/0120034 A1 Apr. 25, 2019

Related U.S. Application Data

(63) Continuation of application No. PCT/US2018/050905, filed on Sep. 13, 2018.

(60) Provisional application No. 62/558,188, filed on Sep. 13, 2017, provisional application No. 62/571,104, filed on Oct. 11, 2017.

(51) Int. Cl.
| | |
|---|---|
| *E21B 43/25* | (2006.01) |
| *E21B 43/12* | (2006.01) |
| *F17D 1/04* | (2006.01) |
| *E21B 17/00* | (2006.01) |
| *E21B 43/16* | (2006.01) |
| *F16L 9/127* | (2006.01) |

(52) U.S. Cl.
CPC .............. *E21B 43/25* (2013.01); *E21B 17/00* (2013.01); *E21B 43/12* (2013.01); *E21B 43/122* (2013.01); *E21B 43/166* (2013.01); *F17D 1/04* (2013.01); *F16L 9/127* (2013.01)

(58) Field of Classification Search
CPC ...................................................... E21B 17/00
See application file for complete search history.

(56) References Cited

U.S. PATENT DOCUMENTS

| | | | |
|---|---|---|---|
| 4,353,763 A | 10/1982 | Simons | |
| 4,706,713 A | 11/1987 | Sadamitsu et al. | |

(Continued)

FOREIGN PATENT DOCUMENTS

WO 2017087484 A1 5/2017

OTHER PUBLICATIONS

Filing receipt and specification for international application entitled "PVDF Pipe and Methods of Making and Using Same," by Harold W. Long, III, filed Sep. 13, 2018 as serial No. PCT/US2018/050905.

(Continued)

*Primary Examiner* — Anna M Momper
*Assistant Examiner* — Aaron L Lembo
(74) *Attorney, Agent, or Firm* — Conley Rose, P.C.

(57) ABSTRACT

A method comprising: flowing gas from a wellbore penetrating a subterranean formation through a wellhead to yield produced gas; flowing the produced gas through a wellhead line to one or more wellsite processing units to yield wellsite processed gas; and flowing the wellsite processed gas through a gathering line to a gas processing plant, a gas pipeline transmission system, or both, wherein the wellhead line, the gathering line, or both comprise polyvinylidene fluoride (PVDF) pipe having a nominal pipe size of equal to or greater than 2 inches and equal to or less than 16 inches.

25 Claims, 4 Drawing Sheets

(56) References Cited

U.S. PATENT DOCUMENTS

| | | | | |
|---|---|---|---|---|
| 4,786,088 | A | * 11/1988 | Ziu | F16L 7/00 138/113 |
| 6,041,827 | A | 3/2000 | Takahashi et al. | |
| 2005/0170122 | A1 | 8/2005 | Fahrenholz et al. | |
| 2006/0127622 | A1 | 6/2006 | Mohan et al. | |
| 2007/0284108 | A1* | 12/2007 | Roes | E21B 36/04 166/302 |
| 2008/0128134 | A1* | 6/2008 | Mudunuri | C10G 1/02 166/302 |
| 2009/0071652 | A1* | 3/2009 | Vinegar | E21B 36/04 166/303 |
| 2009/0107558 | A1 | 4/2009 | Quigley et al. | |
| 2009/0189617 | A1* | 7/2009 | Burns | E21B 43/24 324/649 |
| 2010/0108379 | A1 | 5/2010 | Edbury et al. | |
| 2013/0122226 | A1* | 5/2013 | Lanier | C08K 3/22 428/36.9 |
| 2014/0291032 | A1 | 10/2014 | Franosch et al. | |
| 2015/0021018 | A1 | 1/2015 | Tunget | |
| 2015/0192223 | A1 | 7/2015 | Walters et al. | |
| 2016/0017136 | A1 | 1/2016 | Hochstetter et al. | |
| 2017/0107793 | A1 | 4/2017 | Sherman | |

OTHER PUBLICATIONS

Filing receipt and specification for international application entitled "PVDF Pipe and Methods of Making and Using Same," by Harold W. Long, III, filed Oct. 11, 2017 as U.S. Appl. No. 62/571,104.

Filing receipt and specification for provisional application entitled "PVDF Pipe and Methods of Making and Using Same," by Harold W. Long, III, filed Sep. 13, 2017 as U.S. Appl. No. 62/558,188.

Foreign communication from a counterpart application—International Search Report and Written Opinion, PCT/US2018/050905, dated Nov. 7, 2018, 12 pages.

Technical Data Sheet entitled "Solef® 1010 polyvinylidene flouride," Jul. 22, 2013, 2 pages, Solvay.

Kynar, Chemical Resistance Chart "Polyvinylidene Flouride," 2017, 12 pages, Arkema Inc.

"Kynar® Fluoropolymers Perfromance Characteristics & Data," 2017, 24 pages, Arkema Inc.

"Standard Specification for unmodified Poly(Vinylidene Fuoride) (PVDF) Molding Extrusion and Coating Materials, Designation: D3222-05," 2017, 5 pages, ASTM International.

"Red & Natural PVDF (Kynar) Schedule 80 Threaded Pipe, Valves & Fittings," http://plastics.fwwebb.com/category/df-kynar-schedule-80-threaded-pipe-valves-fittings, 2016, 3 pages, F.W. Webb Company.

"Materials for Orion Acid Waste Pipe," http://www.orionfittings.com/aw_materials.asp, 2019, 2 pages, Orion Fittings.

"PVDF Piping," http://media.wattswater.com/PF-OR-PlenumPiping.pdf, 2015, 1 page, Orion Fittings.

"PVDF Piping The Only Safe Plastic Choice for Air Plenums", PF-OR-PlenumPiping, Orion, A Watts Water Technologies Company, 2015 Orion Fittings, 1 page.

"Red & Natural PVDF (Kynar) Schedule 80 Threaded Pipe, Valves & Fittings", F.W. Webb Company, http://plastics.fwwebb.com/category/df-kynar-schedule-80-threaded-pipe-valves-fittings, 3 pages.

"Materials for Orion Acid Waste Pipe", Orion Fittings, http://www.orionfittings.com/aw_materials.asp, 2 pages.

* cited by examiner

PVDF PIPE AND METHODS OF MAKING AND USING SAME

CROSS REFERENCE TO RELATED APPLICATIONS

This application is a continuation of and claims priority to PCT/US2018/050905 filed Sep. 13, 2018 and entitled "PVDF Pipe and Methods of Making and Using Same," which claims priority to U.S. Patent Application No. 62/558,188 filed Sep. 13, 2017 and U.S. Patent Application No. 62/571,104 filed Oct. 11, 2017, which applications are incorporated by reference herein in their entirety.

TECHNICAL FIELD

The present application relates to polyvinylidene fluoride (PVDF) pipes and methods of making and using same.

SUMMARY

Disclosed herein is a method comprising flowing gas from a wellbore penetrating a subterranean formation through a wellhead to yield produced gas; flowing the produced gas through a wellhead line to one or more wellsite processing units to yield wellsite processed gas; and flowing the wellsite processed gas through a gathering line to a gas processing plant, a gas pipeline transmission system, or both, wherein the wellhead line, the gathering line, or both comprise polyvinilydene fluoride (PVDF) pipe having a nominal pipe size of equal to or greater than 2 inches and equal to or less than 16 inches.

Also disclosed herein is a method comprising producing acid gas from a wellbore penetrating a subterranean formation through a wellhead to yield produced acid gas, wherein the produced acid gas comprises methane, water, and one or more corrosive compounds selected from the group consisting of hydrogen sulfide, carbon dioxide, and combinations thereof; and flowing the produced acid gas through a gas gathering system to a gas processing facility to reduce the acidity of the acid gas and yield treated natural gas, wherein the treated natural gas has less hydrogen sulfide, carbon dioxide, or both than the produced acid gas, wherein the gas gathering system comprises one or more flow lines comprising PVDF pipe having a nominal pipe size of equal to or greater than 2 inches and equal to or less than 16 inches.

Further disclosed herein is a method comprising recovering fluid from a wellbore penetrating a subterranean formation through a wellhead to yield a recovered fluid; and flowing the recovered fluid through (i) a gathering system conveying the recovered fluid from the wellhead to a processing unit to produce a processed fluid, (ii) a pipeline transmission system transporting the processed fluid from the processing unit to a distribution point or a storage facility; (iii) a distribution system distributing the processed fluid from the distribution point or storage facility to one or more end users; or (iv) combinations thereof, wherein the gathering system, the pipeline transmission system, the distribution system, or combinations thereof comprise one or more flow lines comprising PVDF pipe having a nominal pipe size of equal to or greater than 2 inches and equal to or less than 36 inches.

Further disclosed herein is a method comprising producing hydrocarbons from a wellbore penetrating a subterranean formation through a wellhead to yield produced hydrocarbons; and flowing the produced hydrocarbons through a hydrocarbon gathering system to a pipeline transmission system, wherein the hydrocarbon gathering system, the pipeline transmission system or both comprise one or more flow lines comprising PVDF pipe having a nominal pipe size of equal to or greater than 2 inches and equal to or less than 36 inches and wherein the PVDF pipe consists essentially of PVDF.

BRIEF DESCRIPTION OF THE DRAWINGS

The detailed description will reference the drawings briefly described below, wherein like reference numerals represent like parts, unless otherwise indicated.

DETAILED DESCRIPTION

Figure 1:
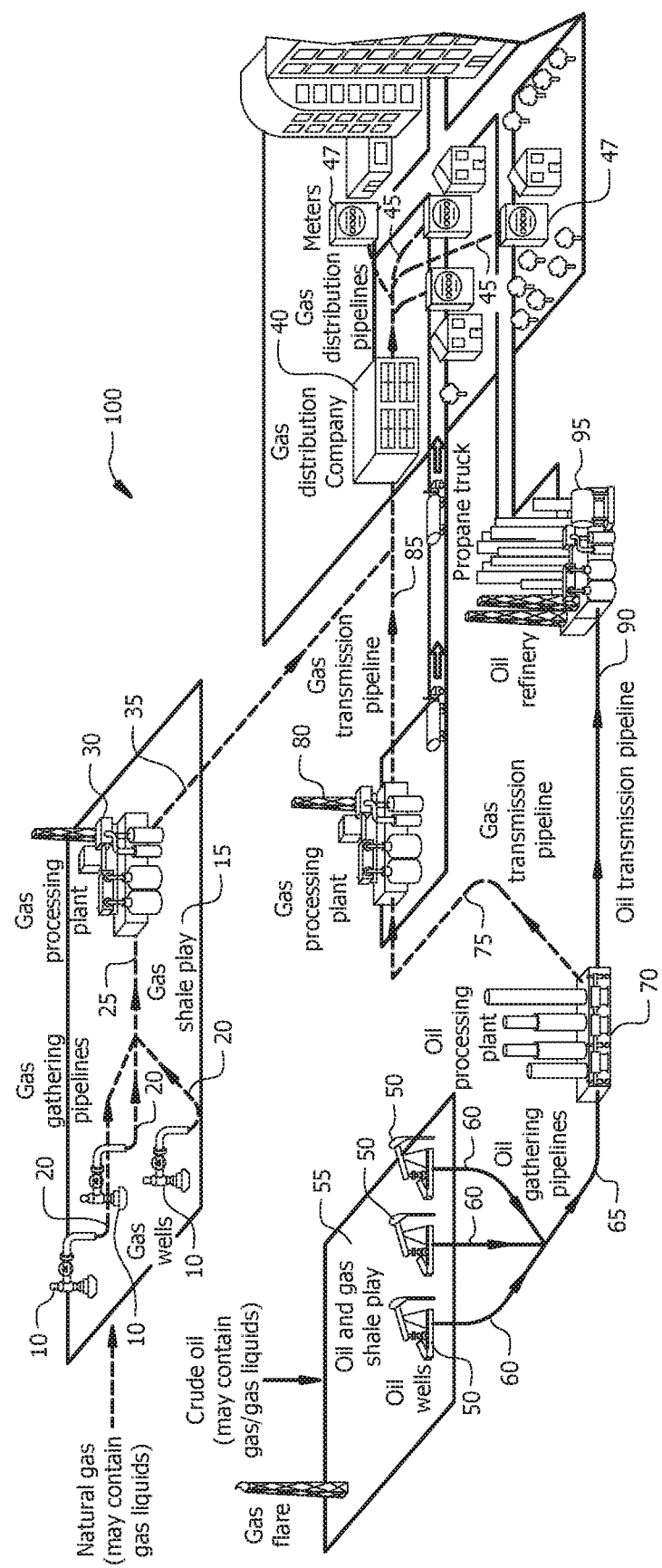
FIG. 1 is a process flow diagram of an example of an oil and gas gathering, long-haul transmission, and distribution system 100.

Disclosed herein are polyvinylidene fluoride (PVDF) pipes, PVDF fittings, and methods of making and using same. A variety of PVDF pipelines, alternatively referred to as PVDF flow lines or PVDF lines, can be formed by combing one or more PVDF pipe components, PVDF fitting components, or combinations thereof as described in detail herein. The PVDF flow lines can be used in a variety of services as described herein, including but not limited to conveyance of oil and/or gas through a gathering system, a long-haul intrastate or interstate transmission pipeline system, or a distribution system.

The PVDF pipes comprise, consist essentially of, or consist of polyvinylidene fluoride fluoropolymer, also referred to as polyvinylidene difluoride; poly(vinylene fluoride); poly(1,1-difluoroethane); poly(1,1-difluoroethylene); 1,1-difluoroethene homopolymer; 1,1-difluoroethylene homopolymerise; and 1,1-difluoroethylene polymer. PVDF is also identified by CAS number 24937-79-9. PVDF has the chemical formula: $-[C_2H_2F_2]_n-$ where n is the number of repeating units in a polymer chain:

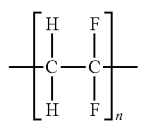

Prior to being formed into a pipe, the PVDF can be referred to as a polymer, fluoropolymer, powder, or resin, and can be in a solid particulate form or solid granular form, for example pellets that are formed via pelletization of PVDF polymer recovered from a polymerization reactor. In an aspect, a suitable PVDF for use in the PVDF pipes of the present disclosure is PVDF 2025 (the PVDF abbreviation is in accordance with ASTM D 1600) classified as Type 2 in accordance with the PVDF material standard ASTM D3222. PVDF 2025 has physical properties and associated testing methods as set forth in Table 1.

TABLE 1

PVDF Fluoropolymer Physical Property Specification

| Physical Property | Value |
|---|---|
| Pipe Material Designation Code | PVDF 2025 |
| HDB at 73° F. (23° C.), psi (MPa), per ASTM D2837 and PPI TR-3[A] | 5000 (34.5) |
| HDB at 284° F. (140° C.) psi (MPa), per ASTM D2837 and PPI TR-3[A] | 800 (5.52) |
| Specific gravity (g/cc) per ASTM D792 | 1.75-1.80 |
| Peak melting endotherm (° C.) per ASTM 3418 | 170-180 |
| Melt Flow Rate - 230° C./5 Kg load (g/10 min) per ASTM D1238 | 4.0-8.0 |
| Apparent melt viscosity (MPa) per ASTM D1238 | 1.3-2.5 |
| Tensile yield strength at 2.0 mm/min and 23° C. (MPa) per ASTM D638 | 50-60 |
| Elongation at break at 2.0 mm/min and 23° C. (%) per ASTM D638 | >20 |

[A]hydrostatic design basis (HDB) listings are published in PPI TR-4.

In an aspect, the PVDF present in the PVDF pipe has physical properties as set forth in Table II.

TABLE 2

Representative PVDF Properties

| | Typical Value | Unit | Test method |
|---|---|---|---|
| Physical | | | |
| Specific Gravity | 1.75 to 1.80 | | ASTM D792 |
| Melt Mass-Flow Rate (MFR)(230° C./5.0 kg) | 4.0 to 8.0 | g/10 min | ASTM D1238 |
| Water Absorption (23° C., 24 hr) | <0.040 | % | ASTM D570 |
| Mold Shrinkage - Linear | 2.0 to 3.0 | % | |
| Mechanical | | | |
| Tensile Modulus[1] [2] (23° C., 2.00 mm) | 1700 to 2500 | MPa | ASTM D638 |
| Tensile Strength[3] | | | ASTM D638 |
| Yield, 23° C., 2.00 mm | 50.0 to 60.0 | MPa | |
| Break, 23° C., 2.00 mm | 30.0 to 50.0 | MPa | |
| Tensile Elongation[3] | | | ASTM D638 |
| Yield, 23° C., 2.00 mm | 5.0 to 10 | % | |
| Break, 23° C., 2.00 mm | 20 to 300 | % | |
| Taber Abrasion Resistance | | | ASTM D4060 |
| 1000 Cycles, 1000 g, CS-10 Wheel | 5.00 to 10.0 | mg | |
| Coefficient of Friction | | | ASTM D1894 |
| Dynamic | 0.150 to 0.350 | | |
| Static | 0.200 to 0.400 | | |
| Impact | | | |
| Charpy Notched Impact Strength - 2 m/s | | | ASTM D6110 |
| 23° C., 4.00 mm | 100 to 200 | J/m | |
| Hardness | | | |
| Shore Hardness (Shore D, 1 sec, 2.00 mm) | 73 to 80 | | ASTM D2240 |
| Thermal | | | |
| Glass Transition Temperature | −40.0 | ° C. | ASTM D4065 |
| Vicat Softening Temperature | 135 to 145 | ° C. | ASTM D1525[4] |
| Melting Temperature | 170 to 175 | ° C. | ASTM D3418 |
| Peak Crystallization Temperature (DSC) | 134 to 144 | ° C. | ASTM D3418 |
| CLTE - Flow (0 to 40° C.) | 0.00014 | cm/cm/° C. | ASTM D696 |
| Specific Heat | | | ASTM E968 |
| 23° C. | 1200 | J/kg/° C. | |
| 100° C. | 1600 | J/kg/° C. | |
| Thermal Conductivity (23° C.) | 0.20 | W/m/K | ASTM C177 |
| Crystallization Heat | 54.0 to 60.0 | J/g | ASTM D3417 |
| Crystallization Point | 137 to 144 | ° C. | ASTM D3418 |
| Heat of Fusion | 57.0 to 66.0 | J/g | ASTM D3417 |
| Electrical | | | |
| Surface Resistivity | >1.0E+14 | ohm | ASTM D257 |
| Volume Resistivity | >1.0E+14 | ohm · cm | ASTM D257 |
| Dielectric Strength (23° C.) | 20 to 25 | kV/mm | ASTM D149 |
| Dielectric Constant (23° C., 1.00 mm, 1 kHz) | 7.00 to 10.0 | | ASTM D150 |

TABLE 2-continued

Representative PVDF Properties

| | Typical Value Unit | Test method |
|---|---|---|
| Flammability | | |
| Flame Rating (0.100 mm) | V-0 | UL 94 |
| Oxygen Index[5] (3.00 mm) | 44% | ASTM D2863 |

Notes:
Typical properties: these are not to be construed as specifications.
[1]Type IV, 1.0 mm/min
[2]Mechanical properties are significantly affected by the sample preparation method.
[3]Type IV, 50 mm/min
[4]Rate A (50° C./h), Loading 2 (50 N)
[5]Sheet Suitable PVDF for use in the PVDF pipes of the present disclosure is sold under a variety of brand names including KF (Kureha), HYLAR (Solvay), KYNAR (Arkema) and SOLEF (Solvay). In an aspect, the PVDF present in the PVDF pipe is SOLEF 1010 and has physical properties as set forth in Table II.

The PVDF (e.g., PVDF pellets) can be formed into PVDF pipes, for example via melt extrusion as described in more detail herein. In an aspect, the PVDF pipes are solid wall pipes. In an aspect, the solid wall PVDF pipes are extruded pipes consisting of one homogeneous layer of PVDF. In an aspect, the solid wall PVDF pipes have an about uniform wall thickness along a 360° circumferential cross-section. In an aspect, the solid wall PVDF pipes are extruded pipes consisting of one homogeneous layer of PVDF having an about uniform wall thickness along a 360° circumferential cross-section. In an aspect, the solid wall PVDF pipes have dimensions, e.g., nominal pipe size, OD, and wall thickness, as set forth in more detail herein, for example in Tables 3, 4, and 5.

The PVDF pipes can have a nominal pipe size (NPS) ranging from equal to or greater than 2 inches to equal to or less than 36 inches, alternatively ranging from equal to or greater than 2 inches to equal to or less than 24 inches, alternatively ranging from equal to or greater than 2 inches to equal to or less than 16 inches, alternatively ranging from equal to or greater than 2 inches to equal to or less than 12 inches, alternatively ranging from equal to or greater than 2 inches to equal to or less than 10 inches, alternatively ranging from equal to or greater than 3 inches to equal to or less than 36 inches, alternatively ranging from equal to or greater than 3 inches to equal to or less than 24 inches, alternatively ranging from equal to or greater than 3 inches to equal to or less than 16 inches, alternatively ranging from equal to or greater than 3 inches to equal to or less than 12 inches, alternatively ranging from equal to or greater than 3 inches to equal to or less than 10 inches, alternatively ranging from equal to or greater than 4 inches to equal to or less than 36 inches, alternatively ranging from equal to or greater than 4 inches to equal to or less than 24 inches, alternatively ranging from equal to or greater than 4 inches to equal to or less than 16 inches, alternatively ranging from equal to or greater than 4 inches to equal to or less than 12 inches, alternatively ranging from equal to or greater than 4 inches to equal to or less than 10 inches, alternatively ranging from equal to or greater than 5 inches to equal to or less than 36 inches, alternatively ranging from equal to or greater than 5 inches to equal to or less than 24 inches, alternatively ranging from equal to or greater than 5 inches to equal to or less than 16 inches, alternatively ranging from equal to or greater than 5 inches to equal to or less than 12 inches, alternatively ranging from equal to or greater than 5 inches to equal to or less than 10 inches, alternatively ranging from equal to or greater than 6 inches to equal to or less than 36 inches, alternatively ranging from equal to or greater than 6 inches to equal to or less than 24 inches, alternatively ranging from equal to or greater than 6 inches to equal to or less than 16 inches, alternatively ranging from equal to or greater than 6 inches to equal to or less than 12 inches, alternatively ranging from equal to or greater than 6 inches to equal to or less than 10 inches, alternatively ranging from equal to or greater than 8 inches to equal to or less than 36 inches, alternatively ranging from equal to or greater than 8 inches to equal to or less than 24 inches, alternatively ranging from equal to or greater than 8 inches to equal to or less than 16 inches, alternatively ranging from equal to or greater than 8 inches to equal to or less than 12 inches, alternatively ranging from equal to or greater than 8 inches to equal to or less than 10 inches, alternatively ranging from equal to or greater than 16 inches to equal to or less than 36 inches, alternatively ranging from equal to or greater than 18 inches to equal to or less than 36 inches, alternatively ranging from equal to or greater than 20 inches to equal to or less than 36 inches, alternatively ranging from equal to or greater than 22 inches to equal to or less than 36 inches, alternatively ranging from equal to or greater than 24 inches to equal to or less than 36 inches, alternatively ranging from equal to or greater than 26 inches to equal to or less than 36 inches, alternatively ranging from equal to or greater than 28 inches to equal to or less than 36 inches, alternatively ranging from equal to or greater than 30 inches to equal to or less than 36 inches, alternatively ranging from equal to or greater than 32 inches to equal to or less than 36 inches, or alternatively ranging from equal to or greater than 34 inches to equal to or less than 36 inches. The PVDF pipes can have a nominal pipe size of 2, 2.5, 3, 3.5, 4, 4.5, 5, 6, 7, 8, 9, 10, 11, 12, 14, 16, 18, 20, 22, 24, 26, 28, 30, 32, 34, or 36 inches, or any combination or range thereof.

The PVDF pipes can have an outside diameter and tolerance as set forth in Table 3 when measured in accordance with ASTM Test Method D2122. The outside diameter measurement shall be taken at a distance at least 1.5 times the average outside diameter or 11.8 in. [300 mm], whichever is less, from the cut end of the pipe. The values set forth in Tables 3, 4, and 5 shall apply at 73.4±3.6° F. [23±2° C.] without regard to humidity. Larger sizes up to NPS 36 inches (e.g., ≥26 NPS to ≤36 NPS) can also be used with same percentage tolerances, and custom wall thicknesses can be used for any outside diameter.

TABLE 3

PVDF Pipe Outside Diameter and Tolerance

| Nominal Pipe Size (NPS) | Outside Diameter and Tolerance[A] | | | | Outside Surface Irregularity Tolerance[B] | |
|---|---|---|---|---|---|---|
| | Average | | Tolerance | | | |
| | in. | mm | in. | mm | in. | mm |
| 2 | 2.375 | 60.33 | ±0.006 | ±0.15 | 0.06 | 1.5 |
| 2½ | 2.875 | 73.03 | ±0.007 | ±0.18 | 0.06 | 1.5 |
| 3 | 3.500 | 88.90 | ±0.008 | ±0.20 | 0.06 | 1.5 |
| 4 | 4.500 | 114.30 | ±0.009 | ±0.23 | 0.10 | 2.5 |
| 5 | 5.563 | 141.30 | ±0.010 | ±0.25 | 0.10 | 2.5 |
| 6 | 6.625 | 168.28 | ±0.011 | ±0.28 | 0.12 | 3.0 |
| 8 | 8.625 | 219.08 | ±0.013 | ±0.38 | 0.24 | 6.1 |
| 10 | 10.750 | 273.05 | ±0.015 | ±0.38 | 0.24 | 6.1 |
| 12 | 12.750 | 323.85 | ±0.017 | ±0.43 | 0.28 | 7.1 |
| 14 | 14.000 | 355.60 | ±0.063 | ±1.60 | — | — |
| 16 | 16.000 | 406.40 | ±0.072 | ±1.83 | — | — |
| 18 | 18.000 | 457.20 | ±0.081 | ±2.05 | — | — |
| 20 | 20.000 | 508.00 | ±0.090 | ±2.29 | — | — |
| 22 | 22.000 | 558.80 | ±0.099 | ±2.51 | — | — |
| 24 | 24.000 | 609.60 | ±0.108 | ±2.74 | — | — |

[A]Outside diameter rounded to 3 decimal places for inch dimensions or to 2 decimal places for mm dimensions.
[B]Determined in accordance with Outside Surface Irregularity Test Method A or B.

Outside Surface Irregularity Test Method A: apply a rounding device to the pipe and tighten securely. At any gaps between the rounding device and the pipe circumference, fit a feeler gage or gage wire having the same thickness as the outside surface irregularity tolerance specified in Table 3 into the gap. If the gage does not fit, the pipe is in compliance. To ensure that the full circumference is checked, rotate the rounding device approximately 90 degrees, tighten securely and repeat the measurement procedure.

Outside Surface Irregularity Test Method B: apply a rounding device to the pipe and tighten securely. Determine the average outside diameter of the pipe within 2 in. [50.8 mm] to the edge of the rounding device using a circumferential wrap tape (pi-tape). Measure the pipe outside diameter at any gaps between the rounding device and the pipe outside diameter with calipers. The caliper diameter measurement shall not differ from the average outside diameter measurement by more than the outside surface irregularity tolerance specified in Table 3.

The PVDF pipes can have a pipe wall thickness for nominal pipe sizes as set forth in Tables 4 and 5 when measured in accordance with ASTM Test Method D2122. For pipe larger than nominal pipe size 12, the wall thickness variability (eccentricity) as measured and calculated in accordance with ASTM Test Method D2122 in any diametrical cross section of the pipe shall not exceed 12 percent. Standard dimension ratio (SDR), also referred to as dimension ratio (DR), is a unitless number that is equal to the average outside diameter (OD) of a pipe divided by the minimum wall thickness (t) of the pipe, with OD and t having common measurement units (e.g., inches). The SDR is a "standard" DR because the SDR is typically one of the following values per ASTM: 5.0, 6.0, 7.3, 9.0, 11.0, 13.5, 15.5, 17.0, 19.0, 21.0, 23.5, 26.0, 32.5, or 35. Larger DRs up to 36 (e.g., ≥26 DR to ≤36 DR) can also be used with same percentage tolerances, and custom wall thicknesses can be used.

TABLE 4

Wall Thickness and Tolerance of ≤12 in. Nominal Pipe Size

| Nominal Pipe Size (NPS) | DR | Minimum Wall Thickness[A] | | Tolerance[B] | |
|---|---|---|---|---|---|
| | | in. | mm | in. | mm |
| 2 | 11.0 | 0.216 | 5.49 | +0.026 | +0.66 |
| | 9.0 | 0.264 | 6.71 | +0.032 | +0.81 |
| | 7.3 | 0.325 | 8.26 | +0.039 | +0.99 |
| | 7.0 | 0.339 | 8.61 | +0.041 | +1.04 |
| 3 | 21.0 | 0.167 | 4.24 | +0.020 | +0.51 |
| | 17.0 | 0.206 | 5.23 | +0.025 | +0.64 |
| | 13.5 | 0.259 | 6.58 | +0.031 | +0.79 |
| | 11.0 | 0.318 | 8.08 | +0.038 | +0.97 |
| | 9.0 | 0.389 | 9.88 | +0.047 | +1.19 |
| | 7.0 | 0.500 | 12.70 | +0.060 | +1.52 |
| 4 | 32.5 | 0.138 | 3.51 | +0.017 | +0.43 |
| | 26.0 | 0.173 | 4.39 | +0.021 | +0.53 |
| | 21.0 | 0.214 | 5.44 | +0.026 | +0.66 |
| | 17.0 | 0.265 | 6.73 | +0.032 | +0.81 |
| | 13.5 | 0.333 | 8.46 | +0.040 | +1.02 |
| | 11.0 | 0.409 | 10.39 | +0.049 | +1.24 |
| | 9.0 | 0.500 | 12.70 | +0.060 | +1.52 |
| | 7.0 | 0.643 | 16.33 | +0.077 | +1.96 |
| 5 | 32.5 | 0.171 | 4.35 | +0.021 | +0.52 |
| | 26.0 | 0.214 | 5.43 | +0.027 | +0.65 |
| | 21.0 | 0.265 | 6.73 | +0.032 | +0.81 |
| | 17.0 | 0.327 | 8.31 | +0.039 | +1.00 |
| | 13.5 | 0.412 | 10.47 | +0.049 | +1.26 |
| | 11.0 | 0.506 | 12.85 | +0.061 | +1.54 |
| | 9.0 | 0.618 | 15.70 | +0.074 | +1.88 |
| | 7.0 | 0.795 | 20.19 | +0.095 | +2.42 |
| 6 | 32.5 | 0.204 | 5.18 | +0.024 | +0.61 |
| | 26.0 | 0.255 | 6.48 | +0.031 | +0.79 |
| | 21.0 | 0.315 | 8.00 | +0.038 | +0.97 |
| | 17.0 | 0.390 | 9.91 | +0.047 | +1.19 |
| | 13.5 | 0.491 | 12.47 | +0.059 | +1.50 |
| | 11.0 | 0.602 | 15.29 | +0.072 | +1.83 |
| | 9.0 | 0.736 | 18.69 | +0.088 | +2.24 |
| | 7.0 | 0.946 | 24.03 | +0.114 | +2.90 |
| 8 | 32.5 | 0.265 | 6.73 | +0.032 | +0.81 |
| | 26.0 | 0.332 | 8.43 | +0.040 | +1.02 |
| | 21.0 | 0.411 | 10.44 | +0.049 | +1.24 |
| | 17.0 | 0.507 | 12.88 | +0.061 | +1.55 |
| | 13.5 | 0.639 | 16.23 | +0.077 | +1.96 |
| | 11.0 | 0.784 | 19.91 | +0.094 | +2.39 |
| | 9.0 | 0.958 | 24.33 | +0.115 | +2.92 |
| | 7.0 | 1.232 | 31.29 | +0.148 | +3.76 |
| 10 | 32.5 | 0.331 | 8.41 | +0.040 | +1.02 |
| | 26.0 | 0.413 | 10.49 | +0.050 | +1.27 |
| | 21.0 | 0.512 | 13.00 | +0.061 | +1.55 |
| | 17.0 | 0.632 | 16.05 | +0.076 | +1.93 |
| | 13.5 | 0.796 | 20.22 | +0.096 | +2.44 |
| | 11.0 | 0.977 | 24.82 | +0.117 | +2.97 |
| | 9.0 | 1.194 | 30.33 | +0.143 | +3.63 |
| | 7.0 | 1.536 | 39.01 | +0.184 | +4.67 |
| 12 | 32.5 | 0.392 | 9.96 | +0.047 | +1.19 |
| | 26.0 | 0.490 | 12.45 | +0.059 | +1.50 |
| | 21.0 | 0.607 | 15.42 | +0.073 | +1.85 |
| | 17.0 | 0.750 | 19.05 | +0.090 | +2.29 |
| | 13.5 | 0.944 | 23.98 | +0.113 | +2.87 |
| | 11.0 | 1.159 | 29.44 | +0.139 | +3.53 |
| | 9.0 | 1.417 | 35.99 | +0.170 | +4.32 |
| | 7.0 | 1.821 | 46.25 | +0.219 | +5.56 |

[A]Minimum wall thickness = average outside diameter (from Table 3) divided by DR (from Table 4), and rounded to 3 decimal places for inch dimensions, or to 2 decimal places for mm dimensions.
[B]Wall thickness tolerance = plus 12% of the minimum wall thickness, and rounded to 3 decimal places for inch dimensions, or to 2 decimal places for mm dimensions.

TABLE 5

Wall Thickness[A] for >12-in. Nominal Pipe Size

| Nominal Pipe Size (NPS) | | Minimum Wall Thickness | |
|---|---|---|---|
| | | in. | mm |
| 14 | 32.5 | 0.431 | 10.95 |
| | 26.0 | 0.538 | 13.67 |
| | 21.0 | 0.667 | 16.94 |
| | 17.0 | 0.824 | 20.93 |
| | 13.5 | 1.037 | 26.34 |
| | 11.0 | 1.273 | 32.33 |
| | 9.0 | 1.556 | 39.52 |
| 16 | 32.5 | 0.492 | 12.50 |
| | 26.0 | 0.615 | 15.62 |
| | 21.0 | 0.762 | 19.35 |
| | 17.0 | 0.941 | 23.90 |
| | 13.5 | 1.185 | 30.10 |
| | 11.0 | 1.455 | 36.96 |
| | 9.0 | 1.778 | 45.16 |
| 18 | 32.5 | 0.554 | 14.07 |
| | 26.0 | 0.692 | 17.58 |
| | 21.0 | 0.857 | 21.77 |
| | 17.0 | 1.059 | 26.90 |
| | 13.5 | 1.333 | 33.86 |
| | 11.0 | 1.636 | 41.55 |
| 20 | 32.5 | 0.615 | 15.62 |
| | 26.0 | 0.769 | 20.22 |
| | 21.0 | 0.952 | 24.18 |
| | 17.0 | 1.176 | 29.87 |
| | 13.5 | 1.481 | 37.62 |
| | 11.0 | 1.818 | 46.18 |
| 22 | 32.5 | 0.677 | 17.20 |
| | 26.0 | 0.846 | 21.49 |
| | 21.0 | 1.048 | 26.62 |
| | 17.0 | 1.294 | 32.87 |
| | 13.5 | 1.630 | 41.40 |
| 24 | 32.5 | 0.738 | 18.75 |
| | 26.0 | 0.923 | 23.44 |
| | 21.0 | 1.143 | 29.03 |
| | 17.0 | 1.412 | 35.86 |
| | 13.5 | 1.778 | 45.16 |

[A]Minimum wall thickness = average outside diameter (from Table 3) divided by DR (from Table 5), and rounded to 3 decimal places for inch dimensions, or to 2 decimal places for mm dimensions.

The PVDF pipes can be substantially round or circular in cross-sectional shape, in contrast to an elliptical shape. When exiting production line processing equipment but before packaging for shipment, the PVDF pipes can have an ovality (elliptical shape) that does not exceed 5 percent when determined in accordance with ASTM Test Method D2122. For example, to determine ovality measure the average outside diameter with a circumferential wrap tape (pi-tape). Determine the maximum and minimum diameter at the same location where the average diameter is measured with calipers or a tape measure accurate to 1/32 in. [0.80 mm] for 16-in. and smaller pipes or to 1/16 in. [1.59 mm] for larger pipes. When minimum (or maximum) diameter is determined, rotate calipers or tape measure approximately 90 degrees around the pipe circumference to determine the corresponding maximum (or minimum) diameter. Calculate ovality by subtracting the minimum diameter from the maximum diameter, dividing the difference by the measured average outside diameter, and multiplying by one hundred. When maximum and minimum diameter are measured at the end of the pipe, the average outside diameter shall be measured 11.8 in. [300 mm] or one pipe diameter, whichever is less, from the end of the pipe so that the average outside diameter measurement is not affected by toe-in.

The PVDF pipes can be substantially free of toe-in, i.e., there is no taper or conical shape at the cut end of a section of PVDF pipe due to a slightly smaller diameter at the cut end of the PVDF pipe. In an aspect, when measured in accordance with ASTM Test Method D2122, the outside diameter at the cut end of the pipe shall not be more than 1.5 percent smaller than the outside diameter per Table 3.

The PVDF pipes can have a pressure rating (PR), which is also referred to as the design pressure or maximum operating pressure (MOP), as determined in accordance with Equation 1. The PR is the estimated maximum pressure the PVDF pipe is capable of withstanding continuously with a high degree of certainty that failure of the PVDF pipe will not occur.

$$PR = 2(HDS)(DF_C)(DF_T)/(DR-1) \quad \text{(Eq. 1)}$$

where:
PR=the pressure rating in units of psig,
HDS=a hydrostatic design stress which is determined by HDB×$DF_S$ and expressed in units of psi,
HDB=hydrostatic design basis in units of psi (see Table 1),
$DF_S$=service or application design factor,
DR=dimension ratio (see Tables 4 and 5),
$DF_C$=chemical design factor (see Table 6), and
$DF_T$=temperature design factor (see Table 7).

TABLE 6

Chemical Design Factor ($DF_C$) for Use With Equation 1

| Chemical | ($DF_C$) |
|---|---|
| Dry gas gathering | 1.00 |
| Wet gas gathering | 1.00 |
| Multiphase fluid | 1.00 |
| Liquid hydrocarbons | 1.00 |
| Oilfield water | 1.00 |
| Crude Oil | 1.00 |

TABLE 7

Temperature Design Factor ($DF_T$) for Use with Equation 1

| Design Service Temperature | | ($DF_T$) |
|---|---|---|
| ° F. | ° C. | PVDF |
| 73 | 23 | 1.00 |
| 104 | 40 | 0.84 |
| 140 | 60 | 0.67 |
| 176 | 80 | 0.52 |
| 212 | 100 | 0.39 |
| 248 | 120 | 0.25 |
| 284 | 140 | 0.16 |

For example, using Equation (1) with an HDS of 3150 psi based on a service design factor of 0.63, a chemical design factor of 1.0, a temperature design factor of 1.0 and DR 7 pipe, the pressure rating is:

$$PR = 2(HDS)(DFC)(DFT)/(DR-1) = 2(3150)(1)(1)/(7-1) = 1050 \text{ psig.}$$

The PVDF pipes can have a PR as set forth in Table 8 when measured in accordance with Equation (1) based on a 0.63 service design factor for PVDF and Plastics Pipe Institute (PPI) TR-4 Hydrostatic Design Basis (HDB) listings of 5000 psi@73° F. (23° C.), 1250 psi@248° F. (120°

C.), and 800 psi@284° F. (140° C.), using PPI TR-3 long-term hydrostatic strength (LTHS) interpolation are provided as follows:

TABLE 8

Pressure Ratings of PVDF Pipe

| Temp °F. | HDS psi | SDR | | | | | | | | | |
|---|---|---|---|---|---|---|---|---|---|---|---|
| | | 32.5 | 26 | 21 | 19 | 17 | 15.5 | 13.5 | 11 | 9 | 7 |
| | | Pressure Rating, psig | | | | | | | | | |
| 73 | 3150 | 200 | 252 | 315 | 350 | 394 | 434 | 504 | 630 | 788 | 1050 |
| 100 | 2695 | 171 | 216 | 269 | 299 | 337 | 372 | 431 | 539 | 674 | 898 |
| 120 | 2380 | 151 | 190 | 238 | 264 | 298 | 328 | 381 | 476 | 595 | 793 |
| 140 | 2087 | 132 | 167 | 209 | 232 | 261 | 288 | 334 | 417 | 522 | 696 |
| 160 | 1812 | 115 | 145 | 181 | 201 | 226 | 250 | 290 | 362 | 453 | 604 |
| 180 | 1554 | 99 | 124 | 155 | 173 | 194 | 214 | 249 | 311 | 389 | 518 |
| 200 | 1312 | 83 | 105 | 131 | 146 | 164 | 181 | 210 | 262 | 328 | 437 |
| 220 | 1085 | 69 | 87 | 108 | 121 | 136 | 150 | 174 | 217 | 271 | 362 |
| 240 | 870 | 55 | 70 | 87 | 97 | 109 | 120 | 139 | 174 | 217 | 290 |
| 248 | 785 | 50 | 63 | 79 | 87 | 98 | 108 | 126 | 157 | 196 | 262 |
| 260 | 690 | 44 | 55 | 69 | 77 | 86 | 95 | 110 | 138 | 172 | 230 |
| 284 | 500 | 32 | 40 | 50 | 56 | 63 | 69 | 80 | 100 | 125 | 167 |

In an aspect, the PVDF pipe can have a pressure rating selected from the group consisting of 0 psig, 20 psig, 40 psig, 60 psig, 80 psig, 100 psig, 120 psig, 140 psig, 160 psig, 180 psig, 200 psig, 220 psig, 240 psig, 260 psig, 280 psig, 300 psig, 320 psig, 340 psig, 360 psig, 380 psig, 400 psig, 420 psig, 440 psig, 460 psig, 480 psig, 500 psig, 520 psig, 540 psig, 560 psig, 580 psig, 600 psig, 620 psig, 640 psig, 660 psig, 680 psig, 700 psig, 720 psig, 740 psig, 760 psig, 780 psig, 800 psig, 820 psig, 840 psig, 860 psig, 880 psig, 900 psig, 920 psig, 940 psig, 960 psig, 980 psig, 1000 psig, 1020 psig, 1040 psig, 1050 psig, and one or more ranges comprising any two endpoints selected from the pressure ratings listed in this group.

As described in detail herein, the PVDF pipe can be used for pressurized transport of various fluids such as fluids recovered from a wellbore (e.g., in an oil and gas gathering system). Accordingly, the PVDF pipe can have an operating pressure of greater than 0 psig to an upper limit defined by a pressure rating selected from the group consisting of 0 psig, 20 psig, 40 psig, 60 psig, 80 psig, 100 psig, 120 psig, 140 psig, 160 psig, 180 psig, 200 psig, 220 psig, 240 psig, 260 psig, 280 psig, 300 psig, 320 psig, 340 psig, 360 psig, 380 psig, 400 psig, 420 psig, 440 psig, 460 psig, 480 psig, 500 psig, 520 psig, 540 psig, 560 psig, 580 psig, 600 psig, 620 psig, 640 psig, 660 psig, 680 psig, 700 psig, 720 psig, 740 psig, 760 psig, 780 psig, 800 psig, 820 psig, 840 psig, 860 psig, 880 psig, 900 psig, 920 psig, 940 psig, 960 psig, 980 psig, 1000 psig, 1020 psig, 1040 psig, and 1050 psig. The PVDF pipe can have an operating pressure in a range of from greater than 0 psig to equal to or less than 1050 psig, in a range of from equal to or greater than 125 psig to equal to or less than 1050 psig, in a range of from equal to or greater than 250 psig to equal to or less than 1050 psig, in a range of from equal to or greater than 335 psig to equal to or less than 1050 psig, in a range of from equal to or greater than 400 psig to equal to or less than 1050 psig, in a range of from equal to or greater than 125 psig to equal to or less than 750 psig, in a range of from equal to or greater than 250 psig to equal to or less than 750 psig, in a range of from equal to or greater than 335 psig to equal to or less than 750 psig, in a range of from equal to or greater than 400 psig to equal to or less than 750 psig, in a range of from equal to or greater than 125 psig to equal to or less than 665 psig, in a range of from equal to or greater than 250 psig to equal to or less than 665 psig, in a range of from equal to or greater than 335 psig to equal to or less than 665 psig, in a range of from equal to or greater than 400 psig to equal to or less than 665 psig, in a range of from equal to or greater than 125 psig to equal to or less than 650 psig, in a range of from equal to or greater than 250 psig to equal to or less than 650 psig, in a range of from equal to or greater than 300 psig to equal to or less than 650 psig, in a range of from equal to or greater than 335 psig to equal to or less than 650 psig, in a range of from equal to or greater than 350 psig to equal to or less than 650 psig, in a range of from equal to or greater than 400 psig to equal to or less than 650 psig, in a range of from equal to or greater than 125 psig to equal to or less than 450 psig, in a range of from equal to or greater than 250 psig to equal to or less than 450 psig, in a range of from equal to or greater than 300 psig to equal to or less than 450 psig, in a range of from equal to or greater than 335 psig to equal to or less than 450 psig, in a range of from equal to or greater than 350 psig to equal to or less than 450 psig, or in a range of from equal to or greater than 400 psig to equal to or less than 450 psig.

In an aspect, the PVDF pipe used in an unregulated gas gathering system as described herein has an operating pressure in a range of from greater than 0 psig to equal to or less than 1050 psig for unregulated PVDF pipe having an SDR of 7, in a range of from equal to or greater than 335 psig to equal to or less than 1050 psig for unregulated PVDF pipe having an SDR of 7, or in a range of equal to or greater than 400 psig to equal to or less than 1050 psig for unregulated PVDF pipe having an SDR of 7. In an aspect, the PVDF pipe used in an unregulated gas gathering system as described herein has an operating pressure in a range of from greater than 0 psig to equal to or less than 630 psig for unregulated PVDF pipe having an SDR of 11, in a range of from equal to or greater than 335 psig to equal to or less than 630 psig for unregulated PVDF pipe having an SDR of 11, or in a range of equal to or greater than 400 psig to equal to or less than 630 psig for unregulated PVDF pipe having an SDR of 11.

In an aspect, the PVDF pipe used in a regulated gas gathering system as described herein has an operating pressure in a range of from greater than 0 psig to equal to or less than 650 psig for regulated PVDF pipe having an SDR of 7, in a range of from greater than 125 psig to equal to or less than 650 psig for regulated PVDF pipe having an SDR of 7, or in a range of from greater than 250 psig to equal to or less than 650 psig for regulated PVDF pipe having an SDR of 7. In an aspect, the PVDF pipe used in a regulated gas gathering system as described herein has an operating pressure in a range of from greater than 0 psig to equal to or less than 400 psig for regulated PVDF pipe having an SDR of 11, in a range of from greater than 125 psig to equal to or less than 400 psig for regulated PVDF pipe having an SDR of 11, or in a range of from greater than 250 psig to equal to or less than 400 psig for regulated PVDF pipe having an SDR of 11. Regulated PVDF pipe refers to pipe that is used in a pipeline or flow line that is subject to one or more U.S. state or federal regulations, e.g., pressure rating regulations, based upon the use of the PVDF pipe in a gathering system, a long-haul intrastate and interstate pipeline system, and/or a distribution system as described herein. Examples of applicable PVDF pipe regulations include but are not limited to regulations administered by the U.S. Pipeline and Hazardous Materials Safety Administration (PHMSA), for example as described in 49 CFR Part 192 and Federal Register Vol. 71, No. 50, Mar. 15, 2006. Unregulated PVDF pipe refers to pipe that is not subject to one or more U.S. state or federal regulations, e.g., pressure rating regulations, based upon the use of the PVDF pipe in a gathering system, a long-haul intrastate and interstate pipeline system, and/or a distribution system as described herein.

The PVDF pipe can be subjected to operating temperatures (e.g., ambient temperature, temperature of fluids flowing through the pipe, or both) ranging from −40° F. to 284° F., alternatively ranging from 0° F. to 284° F., alternatively ranging from 73° F. to 284° F., alternatively ranging from 100° F. to 284° F., alternatively ranging from 180° F. to 284° F., alternatively ranging from 200° F. to 284° F., alternatively ranging from 0° F. to 200° F., alternatively ranging from 73° F. to 200° F. For example as shown in Table 8, PVDF pipe having SDR values ranging from 7 to 32.5 and pressure ratings of 1050 to 32 psig can have operating temperatures ranging from 73° F. to 284° F., more specifically an operating temperature selected from the group consisting of 73° F., 100° F., 120° F., 140° F., 160° F., 180° F., 200° F., 220° F., 240° F., 248° F., 260° F., 284° F., and one or more ranges comprising any two endpoints selected from the operating temperatures listed in this group. In an aspect, the PVDF pipe can have an operating temperature selected from the group consisting of −40° F., −20° F., 0° F., 20° F., 40° F., 60° F., 73° F., 100° F., 120° F., 140° F., 160° F., 180° F., 200° F., 220° F., 240° F., 248° F., 260° F., 284° F., and one or more ranges comprising any two endpoints selected from the operating temperatures listed in this group.

The PVDF pipes can have a density of equal to or greater than 1.75 g/cm$^3$ to equal to or less than 1.80 g/cm$^3$, alternatively equal to or greater than 1.76 g/cm$^3$ to equal to or less than 1.79 g/cm$^3$, alternatively about 1.78 g/cm$^3$, alternatively 1.78 g/cm$^3$. In an aspect, the PVDF pipes have a homogenous density of 1.78 g/cm$^3$ throughout PVDF pipe material.

The PVDF pipe can have tensile elongation test result such that the minimum elongation at break for each tensile specimen from the sample shall exceed 20 percent of the gauge length. Four Type III or Type IV tensile specimens per Test Method ASTM D638 are prepared from the sample, one specimen from the middle of each quadrant around the pipe circumference and cut longitudinally from the pipe wall. For small pipe, specimens prepared from adjacent lengths along the sample are acceptable. Cut surfaces of tensile specimens shall be smooth; however, the pipe inside diameter surface in the gauge area shall be left unaltered. Test Method ASTM D638 is carried out at a cross-head separation rate of 0.08 in. per minute [2.0 mm per minute].

PVDF Pipe size NPS 12 and smaller can have a minimum hoop stress at burst of 6500 psi [45 MPa] when tested in accordance with Test Method D1599 at 73.4±3.6° F. [23±2° C.] without regard to humidity. The test sample is five specimens, and specimen ruptures shall be ductile and the minimum hoop stress at burst shall be 6500 psi [45 MPa].

PVDF Pipe size NPS 2 and larger can have a minimum apparent tensile strength at yield 6500 psi [45 MPa] when tested in accordance with ASTM Method D2290 at 73.4±3.6° F. [23±2° C.] without regard to humidity. Five specimens are prepared from the sample per Test Method ASTM D2290.

At an elevated temperature of 176° F. (80° C.), the PVDF pipe exhibits Condition 1: a test pressure hoop stress of 2030 psi at a minimum average time of 200 hours before failure, or Condition 2: a test pressure hoop stress of 1950 psi at a minimum average time of 1000 hours before failure, wherein a tolerance on the elevated temperature is +/−3.6° F. (+/−2° C.) and a tolerance on the test pressure hoop stress is +/−5 psi, wherein an internal pressure is calculated according to:

$$P = \frac{2S}{\left(\frac{D_o}{t} - 1\right)}$$

wherein:
P=test pressure in psig,
S=test pressure hoop stress in psi,
$D_o$=measured outside diameter in inches, and,
t=measured minimum wall thickness in inches.

The "test sample" shall be three specimens of a generally representative pipe or tubing size. Test specimens are conditioned at 73.4±3.6° F. [23±2° C.] without regard to humidity for at least 1 hour in constant temperature circulating water or at least 4 hours in constant temperature circulating air. One of conditions 1 and 2 above is selected and the three test specimens are tested. Specimen length between end closures for pipe size NPS 6 and smaller shall be five times the pipe diameter, but not less than 12-in. [304-mm]. Specimen length between end closures for pipe size larger than NPS 6 shall be the lesser of three times the pipe diameter or 30-in. [762-mm]. The specimens are tested Test Method ASTM D1598 using water as the pressurizing medium for the minimum average hours before failure specified in Condition 1 or 2. Passing results are non-failure for all three specimens at a time equal to or greater than the minimum average time before failure specified in Condition 1 or 2.

When subjected to bendback testing, the bendback specimens from sample PVDF pipe do not reveal inside surface crazing or cracking. Bendback Test Method: From a PVDF pipe sample, squarely cut a pipe ring specimen with a minimum width of 1¼ in. [32 mm]. For wall thickness ⅜ in. [9.5 mm] or less test the entire wall thickness. For wall thickness above ⅜ in. [9.5 mm], remove material from the outside diameter surface of the ring specimen while maintaining an undisturbed inside diameter surface, to produce a ring specimen with consistent wall thickness of ⅜ in. [9.5 mm]. Test the ring in its entirety, or cut the ring into representative sectors to produce individual bend-back test specimens for at least each quadrant around the pipe. In a well-lit area test per the following procedure within 5 min: (1) Bend the specimen inside-out (reverse-bend so that the pipe ID surface is on the outside surface of the bent specimen). (2) Using an apparatus such as a vise or other suitable bending equipment, close the legs of the specimen together. When the specimen legs are closed together, the top of the bend-back specimen shall protrude the lesser of 1⅛ in. [29 mm] or three wall thicknesses above the point of closure (jaws). (3) With the unaided (naked) eye, visually examine the protruding reverse-bent pipe ID surface for brittle cracking or crazing.

The PVDF pipes can have slow crack growth (SCG) resistance exhibiting no failure before 500 hours, no failure before 1000 hours, or no failure before 2000 hours when tested in accordance with PENT slow crack growth testing (Test Method ASTM F1473) using compression molded plaques at a stress of 7.5 MPa, based on the unnotched area, and a test temperature of 80° C. Notch depth shall be in accordance with Table 1 in Test Method ASTM F1473. The PVDF pipe displays linear stress rupture curves as determined in accordance with ASTM D2837 at 86° F., 122° F., 212° F., 248° F., 284° F., and 302° F. as discussed in more detail in Example 3, which is further evidence of excellent resistance to slow crack growth. The PVDF pipes can have a rapid crack propagation (RCP) resistance when tested in accordance with ISO 13477 S4 Test or ISO 13478 Full Scale Test (FST) using air as the internal medium. The FST critical pressure in air shall be greater than the design pressure of the pipe with a gaseous fluid inside, and this requirement does not apply when the pipe contains a non-compressible liquid fluid.

The PVDF pipes are corrosion resistant. In an aspect, the PVDF pipes have 0% risk of corrosion compared to metallic or steel pipes in the same service (e.g., flowing the same amount and type of fluids under the same operating conditions and environment). In an aspect, the PVDF pipes are not coated, jacketed, wrapped, or otherwise supplemented with additional physical structure or support to reduce, abate, or prevent corrosion on an internal surface, external surface, or both of the PVDF pipes. In an aspect, the PVDF pipes (e.g., the inner bore surface, the outer surface, or the entirety thereof) are (i) not subjected to cathodic protection while commissioned for service; (ii) not subjected to the presence of corrosion inhibitors in fluids flowing through the PVDF pipes; (iii) are not subjected to nondestructive corrosion monitoring or in-line corrosion inspections while commissioned for service; (iv) are not subjected to moisture reduction treatments while commissioned for service such as water removal treatment of fluids prior to being placed into the PVDF pipes; (v) are not subjected to any other remedial measures or methods of corrosion control while commissioned for service; or (vi) any combination of (i) to (v). Commissioned for service includes the time from when a pipe is deemed suitable for its intended use until the time when the pipe is deemed unsuitable for its intended use. In an aspect, a corrosion resistant PVDF pipe consists essentially of, alternatively consists of, PVDF and excludes any other compound or material that is intended to improve corrosion resistance to the PVDF pipe. In an aspect, unlike steel or metallic pipes that corrode, a corrosion resistant PVDF pipe is corrosion resistant and does not contain any (i.e., 0 wt. %) corrosion inhibiting compounds.

The PVDF pipes are chemical resistant. In an aspect, a chemical resistant PVDF pipe consists essentially of, alternatively consists of, PVDF and excludes any other compound or material that is intended to improve chemical resistance to the PVDF pipe. In an aspect, a chemical resistant PVDF pipe does not contain any (i.e., 0 wt. %) chemical resistance enhancing compounds. The PVDF pipes display passing chemical resistance when tested in accordance with ASTM Test Method D543 for the chemicals set forth in Table 9 at the designated testing temperature. For passing chemical resistance: (1) the increase of weight of the test specimen is 2% or less; (2) the reduction in weight of the test specimen is less than 0.3%; and (3) the apparent tensile strength at yield has not changed by more than ±15% from initial value when tested in accordance with ASTM 2290.

TABLE 9

Chemical Resistance Test Conditions

| Chemical | Formula | Concentration | Test temp$^b$ (° C.) | Max recommended temp per literature$^a$ (° C.) |
|---|---|---|---|---|
| Phosphoric Acid | $H_3PO_4$ | 85% | 125 | 135 |
| Sulfuric Acid | $H_2SO_4$ | 80% | 125 | 130 |
| Aliphatic Hydrocarbon (n-Hexane) | $CH_3(CH_2)_4CH_3$ | 100% | 50 | 141 |
| Aromatic Hydrocarbon (Toluene) | $C_6H_5CH_3$ | 100% | 50 | 80 |
| Hydrogen Sulfide (sour oil or gas) | $H_2S$ | 100% | 100 | 135 |
| Crude Oil | — | 100% | 150 | 150 |
| Gasoline | — | 100% | 125 | 125 |
| Alcohol (1-Propanol) | $C_3H_7OH$ | 100% | 50 | 66 |
| Ether (Isoamyl ether) | $(CH_3)_2C_3H_5OC_3H_5(CH_3)_2$ | 100% | 125 | 121 |

$^a$Chemical Resistance of Plastics and Elastomers from Plastic Design Library

For example, to determine chemical resistance of PVDF pipe, a test specimen is prepared. Where available, the test specimen shall be a ring cut from NPS 2 SDR 11 pipe. For PVDF materials that are not readily available as NPS 2 SDR 11 pipe, the test specimen shall be a plaque of material ¼ by 2 by 4 in. (6.3 by 50.8 by 101.6 mm) with a 1 in. (25.4 mm) wide reduced section. Five specimens are tested with each chemical. The specimens are weighted to the nearest 0.005 g and completely immersed in the chemicals for 30 days. Upon removal from the chemicals, the specimens are wiped clean with a clean dry cloth. The cleaned specimens are conditioned in air for 2 to 2¼ hours and reweighed. The increase in weight is calculated to the nearest 0.01% on the basis of initial weight. The apparent tensile strength at yield is determined for the test specimen in accordance with Test Method ASTM D2290 within ½ hour after weighing. The weight and apparent tensile strength of each specimen is evaluated for conformance to the passing requirement set forth above.

The PVDF pipes are ultra violet (UV) and ozone resistant and are suitable to extended service intervals (≥50 years, ≥75 years, or ≥100 years) when exposed to the environment and direct sunlight. In an aspect, a UV and ozone resistant PVDF pipe consists essentially of, alternatively consists of, PVDF and excludes any other compound or material that is intended to improve UV and/or ozone resistance to the PVDF pipe. In an aspect, a UV and ozone resistant PVDF pipe does not contain any (i.e., 0 wt. %) UV and/or ozone resistance enhancing compounds. The PVDF pipes do not support growth of fungi when tested as described in Method 508 of Military Standard 810B (Jun. 15, 1967). The PVDF pipes are resistant to nuclear radiation and the original tensile strength of the pipes is essentially unchanged after exposure to 100 megarads of gamma radiation from a Cobalt-60 source at 122° F. (50° C.) and in high vacuum (10−6 torr). The PVDF pipes are high purity (e.g., suitable for food and ultra-pure water use). The PVDF pipes have low flammability and low smoke characteristics. The PVDF pipes are highly abrasion resistant.

The PVDF pipes can be formed by melting PVDF polymer (e.g., pellets) to form a PVDF polymer melt and passing the PVDF polymer melt through a template (e.g., an annular shaped die) having a flow channel sized to produce the desired solid wall pipe size (e.g., a NPS having a specified DR=outside diameter/minimum wall thickness). For example, the PVDF pipes can be formed via melt extrusion wherein PVDF polymer (e.g., pellets) are placed in a hopper and fed into an extruder (e.g., having a single screw or twin screws disposed within a barrel that can be heated) wherein the PVDF polymer is melted as it is passed from the feed end of the barrel to the exit end of the barrel where the melted (i.e., molten) polymer exits the barrel and passes through a die to form the solid wall PVDF pipe having specified dimensions such as those set forth in Tables 3 to 5. The solid wall PVDF pipe exiting the extruder can be cut into straight sections having a desired length, for example, 10, 11, 12, 13, 14, 15, 16, 17, 18, 19, 20, 21, 22, 23, 24, 25, 26, 27, 28, 29, 30, 31, 32, 33, 34, 35, 35, 37, 38, 39, 40, 41, 42, 43, 44, 45, 46, 47, 48, 49, or 50 feet sections. In an aspect, the solid wall PVDF pipes can be formed into straight sections of any desired length, including lengths equal to or greater than 50 feet and having specified dimensions such as those set forth in Tables 3 to 5. In an aspect, the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections.

The solid wall PVDF pipes can be formed without adding any colorant or pigments to the PVDF polymer during extrusion. Furthermore, the solid wall PVDF pipes can be formed without adding any components or additives such as UV stabilizers, plasticizers, processing aids, lubricants, reinforcing fibers, additional polymers, and the like during extrusion. Furthermore, the solid wall PVDF pipes do not contain any additional structural support or reinforcing components such as reinforcing fibers, fiber windings, composite materials, metal casings, metal jackets or sleeves, or the like. In an aspect, the solid wall PVDF pipes are not part of, a component of, or integral with a composite material flow line or a metal jacketed flow line, for example where the PVDF component of the composite material flow line or metal jacketed flow line functions primarily as a liner for corrosion resistance or the like and the remaining components of the composite flow line or metal jacketed flow line function primarily to provide pressure containment and structural integrity. In an aspect, the solid wall PVDF pipe is not a jacketed metal flow line (e.g., not a subsea umbilical, riser, or flow line (SURF)) suitable for use as in a subsea completion to flow fluids from a subsea wellhead to location at or near the surface. Accordingly, the solid wall PVDF pipes formed via melt extrusion can consist essentially of, alternatively consist of, PVDF polymer, and thereby exclude additives, reinforcing components, composite materials, metal jackets, and the like. In an aspect, the solid wall PVDF pipes formed via melt extrusion can contain ≥95, 96, 97, 98, 99, 99.9, or 99.99% by weight PVDF. In an aspect, the solid wall PVDF pipe formed via melt extrusion contains 100% by weight PVDF. The solid wall PVDF pipe can be formed with identification characteristics, for example colored stripes coextruded into the outside surface of the pipe wall during the extrusion process. In an aspect, the solid wall PVDF pipe has stripes conforming to the APWA Uniform Color Code, for example yellow stripes for regulated PVDF pipes intended for gas distribution or regulated gas gathering. In an aspect, the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections having yellow stripes indicating that the solid wall PVDF pipes are intended for regulated gas distribution or gas gathering, and wherein the solid wall PVDF pipes consist essentially of PVDF except for the additives used to form the yellow stripes in the outside wall of the PVDF pipe.

The PVDF polymer can be formed into PVDF fittings for use in joining sections of solid wall PVDF pipe to form a fluid flow conduit (e.g., a PVDF flow line) having desired fluid flow characteristics (e.g., size, length, capacity, direction). The PVDF fittings can be formed via melting the PVDF polymer in an extruder as described herein, and passing molten PVDF into a die or mold suitable to form a solid wall PVDF fitting having specified shape and dimensions. The solid wall PVDF fittings can have cross-sectional dimensions corresponding to the solid wall PVDF pipe to be joined by the fittings, for example having specified dimensions such as those set forth in Tables 3 to 5. The solid wall PVDF fittings can be selected from the group consisting of tees, elbows, flanges, 3-way fittings, 4-way fittings, 5-way fittings, connectors, reducers, expanders, couplings, nipples, and any combination thereof. In an aspect, the solid wall PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof.

PVDF pipe sections (e.g., 40 or 50 foot sections) can be joined together (e.g., connected, coupled, fused, etc.) to form PVDF flow lines (e.g., flow line segments comprised of a plurality of PVDF pipe sections and/or PVDF fittings) having desired fluid flow characteristics (e.g., size, length, capacity, direction). PVDF flow lines are flow lines that comprise any combination of PVDF pipe described herein (also referred to as PVDF pipe components) and/or PVDF fittings as described herein (also referred to as PVDF fitting components). PVDF flow lines can comprise PVDF pipe components and/or PVDF fitting components as required to form a flow line having specified design criteria. For example, two or more PVDF pipe sections (e.g., 40 or 50 foot sections) can be joined directly to each other (e.g., via butt fusion) or indirectly to each other (e.g., via a fitting such as a tee or elbow) to form a PVDF flow line. In an aspect, a butt fusion process is used to join two or more PVDF pipe sections (e.g., two PVDF pipe sections having the same DR) directly together, to join a section of PVDF pipe directly to a corresponding PVDF fitting (e.g., a PVDF pipe and PVD fitting having the same DR), or combinations thereof to form a PVDF flow line having desired fluid flow characteristics (e.g., size, length, capacity, direction). In a butt fusion process, the mating surfaces of corresponding butts (or ends) of the PVDF pipe and/or PVDF fitting to be joined together are cleaned, faced, aligned, and simultaneously melted (e.g., with a hot-plate heater). The heater is removed and the melted mating surfaces are pressed together and held under pressure. As the molten PVDF materials of the combined mating surfaces cool, they mix and fuse into a permanent, monolithic joint. Where two PVDF pipe sections having the same DR are joined and/or a where a PVDF pipe and a PVD fitting having the same DR are joined, the monolithic joint that is formed provides no reduction in the flow capacity of the joined pipe segment at the fused joint. In an aspect, two or more PVDF pipe sections having different SDR values are joined and/or a PVDF pipe and a PVD fitting having different SDR values are joined to form a PVDF flow line, wherein the different SDR values are adjacent values selected from the group consisting of 5.0, 6.0, 7.3, 9.0, 11.0, 13.5, 15.5, 17.0, 19.0, 21.0, 23.5, 26.0, 32.5, and 35. Where two PVDF pipe sections having different SDR values are joined and/or a PVDF pipe and a PVD fitting having different SDR values are joined, the monolithic joint that is formed can have a non-uniform interior flow surface such that there is an expansion or reduction in the inside diameter of the flow path formed by the joint. PVDF flow lines formed from a plurality of PVDF pipe components and/or PVDF fitting components of the type described herein can be used in a variety of end uses to convey a corresponding variety of fluids, as described in more detail herein.

Fluids (e.g., liquid and/or gas) recovered via a well drilled into a subterranean formation can be transported from the wellsite to another location via three major types of pipelines along the transportation route: the gathering system, the long-haul intrastate and interstate transmission pipeline system, and the distribution system. An example of an oil and gas gathering, long-haul transmission, and distribution system 100 is shown in FIG. 1.

Figure 2:
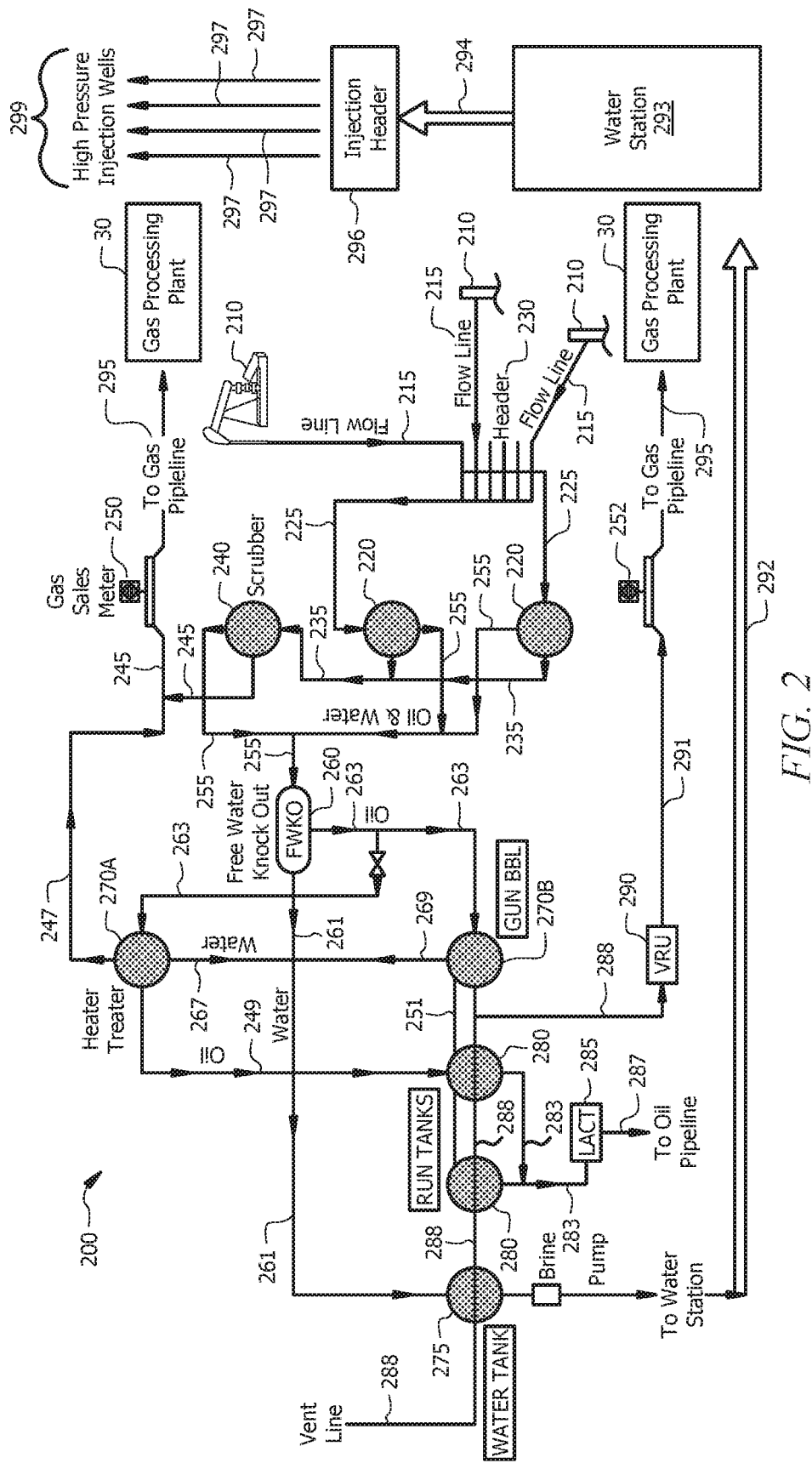
FIG. 2 is a process flow diagram of an example of a wellbore fluid gathering system 200.

Referring to FIG. 1, a plurality of gas wells 10 are drilled and penetrate a subterranean formation, for example a subterranean formation comprising gas-containing shale rock, also referred to as a gas shale play 15. A plurality of gas gathering pipelines 20 (also referred to as gas gathering flow lines or gas gathering lines) are used to gather gas from the wellheads of each individual well 10 and further combine production flows into a combined gas gathering line 25. The individual gas gathering lines 20 can have a size (e.g., flow capacity) relatively smaller than the size (flow capacity) of the combined gas gathering line 25. The gas gathering lines 20 and 25 supply gas (e.g., produced gas and/or wellsite processed gas as shown in FIG. 2) from the wells 10 to a gas processing plant 30. The gas processing plant 30 treats the gas supplied from wells 10, for example by removing water, natural gas liquids, and/or any contaminants such as carbon dioxide and hydrogen sulfide. The gas processing plant 30 is typically located relatively closely to a plurality or cluster of wells 10 associated with a given gas production field or region (e.g., gas shale play 15), and thus can be considered a local, field, or regional gas processing plant. For example, the gas processing plant 30 can have a gas processing capacity equal to or greater than 25,000 MMcfd (million cubic feet per day), 50,000 MMcfd, 75,000 MMcfd, 100,000 MMcfd, 125,000 MMcfd, 150,000 MMcfd, 175,000 MMcfd, 200,000 MMcfd, 225,000 MMcfd, or 250,000 MMcfd. The gas processing plant 30 produces pipeline quality dry natural gas that is transported via a long-haul intrastate or interstate gas transmission pipeline 35 to a destination such as a storage facility or gas distribution company 40. The gas distribution company 40 distributes the dry natural gas via a gas distribution system comprising a plurality of gas distribution pipelines 45 (also referred to as gas distribution flow lines, gas distribution lines, or customer lines) and associated customer gas meters 47.

A plurality of oil wells 50 are drilled and penetrate a subterranean formation, for example a subterranean formation comprising shale rock that contains oil and gas, also referred to as an oil and gas shale play 55. A plurality of oil gathering pipelines 60 (also referred to as oil gathering flow lines or oil gathering lines) are used to gather oil from the wellheads of each individual well 50 and further combine production flows into a combined oil gathering line 65. The individual oil gathering lines 60 can have a size (e.g., flow capacity) relatively smaller than the size (flow capacity) of the combined oil gathering line 65. The oil gathering lines 60 and 65 supply oil (e.g., raw crude oil) from the wells 50 to an oil processing plant 70 (e.g., a tank battery 200 as shown in FIG. 2). The oil processing plant 70 treats the raw crude oil supplied from wells 50, for example by removing water, gas, natural gas liquids, and any contaminants such as carbon dioxide and hydrogen sulfide. The oil processing plant 70 is typically located relatively closely to a plurality or cluster of wells 50 associated with a given oil production field or region (e.g., oil and gas shale play 55), and thus can be considered a local, field, or regional oil processing plant. For example, the oil processing plant 70 can have an oil processing capacity equal to or greater than of 5,000 B/D (barrels per day), 10,000, or 15,000 B/D.

In an aspect, the oil processing plant 70 can be a separation facility that separates gas from oil and provides the separated gas (e.g., wellsite processed gas) via gas pipeline 75 to a gas processing plant 80 for further treatment and provides the separated oil (e.g., wellsite processed oil) via a long-haul intrastate or interstate oil transmission pipeline 90 to an oil refinery 95 for further treatment. Gas processing plant 80 can be the same gas processing plant 30, or can be a different gas processing plant located a distance away. Accordingly, gas transmission line 75 can be a relatively short or long haul transmission pipeline depending upon the distance required. Gas processing plant 80 can function similarly to gas processing plant 30 to produce pipeline quality dry natural gas that is transported via a long-haul intrastate or interstate gas transmission pipeline 85 to a destination such as a storage facility or gas distribution company 40. As noted previously, the gas distribution company 40 distributes the dry natural gas via a gas distribution system comprising a plurality of gas distribution pipelines 45 (also referred to as gas distribution flow lines, gas distribution lines, or customer lines) and associated customer gas meters 47.

Any of the flow lines shown in FIG. 1 can comprise a PVDF flow line formed from one or more sections of PVDF pipe of the type disclosed herein, one or more PVDF fittings of the type disclosed herein, or combinations thereof. For example, the PVDF pipe and fittings disclosed herein, for example the solid wall PVDF pipes of size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings corresponding to PVDF pipe of size NPS≥2 and ≤36, alternatively NPS>6 and ≤24, alternatively NPS>6 and ≤16, (e.g., as described in Tables 3 to 5), can be used in any of the various flow lines described in FIG. 1, including gas gathering lines 20 and 25, long-haul intrastate or interstate gas transmission pipelines 35 and 85, gas distribution lines 45, oil gathering lines 60 and 65, gas pipeline 75, long haul intrastate or interstate oil transmission pipeline 85, or any combination thereof. For example, any of the various flow lines described in FIG. 1 can comprise a plurality of straight, solid wall PVDF pipe sections (e.g., 40 or 50 foot sections) joined together directly (e.g., butt fused as described herein)

or indirectly (via one or more solid wall PVDF fittings as described herein), wherein the solid wall PVDF pipe sections, the solid wall PVDF fittings, or both have dimensions specified in Tables 3 to 5, for example the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof, and wherein the PVDF pipe sections, the PVDF fittings, or both consist essentially of, or consist of, PVDF.

Oil refinery 95 (optionally in combination with one or more chemical production units) processes the oil (e.g., crude oil) into (i) one or more refined products such as motor fuel (e.g., gasoline, diesel, etc.), lubricants, and chemical products (e.g., petrochemicals, including aromatics such as benzene, toluene, and xylene) or feedstocks (e.g., naphtha and gas oil for further processing by the chemical production units to form chemical products, by-products, and waste streams), (ii) one or more by-products, or (iii) one or more waste streams. In addition to oil refinery 95, or as an alternative to oil refinery 95, other industrial processes can employ PVDF flow lines of the type described herein, for example to transport process fluids (e.g., at operating temperatures and operating pressures described herein) within petrochemical plants, industrial chemical plants (e.g., flow lines conveying industrial chemicals), mining operations (e.g., flow lines conveying mining chemicals such as solvents and extraction agents), nuclear facilities (e.g., flow lines conveying radioactive material), fertilizer plants, landfills (e.g., flow line conveying landfill gases), geothermal facilities (e.g., flow lines conveying hot water or steam), wastewater treatment facilities (e.g., flow lines conveying sewage), and the like. Some of the refined products, chemical products, process fluids, by-products, or waste streams can be considered hazardous substances according to applicable regulations. The refined products, chemical products, process fluids, by-products, waste streams, or combinations thereof, including any hazardous substances therein, can be passed through a variety of flow lines related to manufacture, storage, transport or disposal thereof, and one or more of these flow lines can comprise a PVDF flow line formed from one or more sections of PVDF pipe of the type disclosed herein, one or more PVDF fittings of the type disclosed herein, or combinations thereof. For example, one or more of the various flow lines can comprise a plurality of straight, solid wall PVDF pipe sections (e.g., 40 or 50 foot sections) joined together directly (e.g., butt fused as described herein) or indirectly (via one or more solid wall PVDF fittings as described herein), wherein the solid wall PVDF pipe sections, the solid wall PVDF fittings, or both have dimensions specified in Tables 3 to 5, for example the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof, and wherein the PVDF pipe sections, the PVDF fittings, or both consist essentially of, or consist of, PVDF.

In an aspect, a method for transporting fluids from a wellbore comprises recovering fluid (e.g., liquids such as crude and water, gases such as raw natural gas, or multi-phase fluids containing both gases and liquids) from a wellbore penetrating a subterranean formation through a wellhead to yield a recovered fluid; and flowing the recovered fluid through a gathering system, a long-haul intrastate or interstate transmission pipeline system, or a distribution system, wherein one or more flow lines in the gathering system, the long-haul intrastate or interstate transmission pipeline system, or the distribution system comprise a plurality of straight, solid wall PVDF pipe sections (e.g., 40 or 50 foot sections) joined together directly (e.g., butt fused as described herein) or indirectly (via one or more PVDF fittings as described herein), wherein the solid wall PVDF pipe sections, the PVDF fittings, or both have dimensions specified in Tables 3 to 5, for example the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections and/or the PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof, and wherein the PVDF pipes sections, the PVDF pipe fittings, or both consist essentially of, or consist of, PVDF.

In an aspect, a method for transporting fluids from a wellbore comprises recovering fluid (e.g., liquids such as hydrocarbons and water, gases such as raw natural gas, or multi-phase fluids containing both gases and liquids) from a wellbore penetrating a subterranean formation through a wellhead to yield a recovered fluid; and flowing the recovered fluid through (i) a gathering system conveying the recovered fluid from the wellhead to a processing unit to produce a processed fluid, (ii) a pipeline transmission system transporting the processed fluid from the processing unit to a distribution point or a storage facility; (iii) a distribution system distributing the processed fluid from the distribution point or storage facility to one or more end users; or (iv) combinations thereof, wherein the gathering system, the pipeline transmission system, the distribution system, or combinations thereof comprise one or more PVDF flow lines comprising solid wall PVDF pipe having a nominal pipe size of equal to or greater than 2, 4, or 6 inches and equal to or less than 36, 24, 22, 20, 18, or 16 inches (e.g., solid wall PVDF pipe of size NPS≥2 and ≤36, alternatively NPS>6 and ≤24, alternatively NPS>6 and ≤16, (e.g., as described in Tables 3 to 5)). The recovered fluid can comprise gaseous hydrocarbons, crude oil, multi-phase fluids, water, carbon dioxide, hydrogen sulfide, or combinations thereof. For example, the recovered fluid can comprise crude oil, raw natural gas, wet natural gas, dry natural gas, shale gas, acid gas, sour gas, natural gas liquids, produced water, wellbore treatment fluids (e.g., injection steam condensate, acid treatment fluids, fracturing fluids, etc. that are flowed from the surface into the wellbore and/or surrounding formation as part of an enhanced oil recovery process and then flowed back to the surface and recovered) or combinations thereof.

In an aspect, a method for transporting fluids from a wellbore comprises recovering fluid (e.g., liquids such as hydrocarbons and water, gases such as raw natural gas, or multi-phase fluids containing both gases and liquids) from a wellbore penetrating a subterranean formation through a wellhead to yield a recovered fluid; and flowing the recovered fluid through a gathering system, wherein one or more flow lines in the gathering system comprise a plurality of straight, solid wall PVDF pipe sections (e.g., 40 or 50 foot sections) joined together directly (e.g., butt fused as described herein) or indirectly (via one or more PVDF fittings as described herein), wherein the solid wall PVDF pipe sections, the PVDF fittings, or both have dimensions specified in Tables 3 to 5, for example the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof, and wherein the PVDF pipes sections, the PVDF pipe fittings, or both consist essentially of, or consist of, PVDF.

The PVDF pipe and/or PVDF fittings of the type described herein can be used to form all or a part of one or more fluid flow lines in the gathering system. For example, a gathering system is the flow line network and process facilities that transport and control the flow of fluid (e.g., oil and/or gas) from the wells to a storage facility, processing plant or shipping point. A gathering system includes pumps, headers, separators, emulsion treaters, tanks, regulators, compressors, dehydrators, valves and associated equipment. There are two types of gathering systems, radial and trunk line. The radial type brings all the flow lines to a central header, while the trunk-line type uses several remote headers to collect fluid. The latter is mainly used in large fields. The gathering system is also called the collecting system or gathering facility. An example of a wellbore fluid gathering system 200, also referred to as a tank battery, is shown in FIG. 2, wherein one or more of the flow lines shown in FIG. 2 comprise a PVDF flow line formed from one or more sections of PVDF pipe of the type disclosed herein, one or more PVDF fittings of the type disclosed herein, or combinations thereof. A tank battery of the type shown in FIG. 2 can be used for wellsite processing of oil and gas proximate the wellsite (e.g., near a wellhead or cluster of wellheads), for example to separate oil and gas components prior to metering thereof for sale purposes. Thus the tank battery can be disposed between a wellhead or cluster of wellheads (e.g., wellheads producing oil, gas, water, or combinations thereof) and one or more meters (e.g., a gas meter, an oil meter such as a lease automatic custody transfer unit (LACT) or combinations thereof) for measuring salable fluid production from one or more wells. One or more of the flow lines used in a tank battery system can comprise a PVDF flow line formed from one or more sections of PVDF pipe of the type disclosed herein, one or more PVDF fittings of the type disclosed herein, or combinations thereof. For example one or more flow lines used to convey oil, water, gas, or a mixture thereof (e.g., emulsion) from a wellhead directly or indirectly to a metering unit (e.g., a gas meter and/or a LACT unit) can comprise a PVDF flow line formed from the PVDF pipe and PVDF fittings described herein, for example the solid wall PVDF pipes of size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings corresponding to PVDF pipe of size NPS≥2 and ≤36, alternatively NPS>6 and ≤24, alternatively NPS>6 and ≤16, (e.g., as described in Tables 3 to 5).

Referring to FIG. 2, a plurality of wells 210 are drilled and penetrate a subterranean formation, for example a subterranean formation comprising shale rock that contains gas, oil, or a combination of oil and gas. Fluid is produced from the wells 210 to yield the recovered fluid, which can comprise oil, gas, and water (e.g., a mixed phase fluid). The recovered fluid is conveyed from the individual wells 210 (e.g., the wellhead thereof) to a collection header (or collection manifold) 230 via a plurality of flow lines 215, which can be referred to as wellhead-to-manifold flow lines. The recovered, mixed phase fluid is conveyed from the collection header 230 to one or more gas-liquid (G/L) separators 220 via flow lines 225, which can be referred to as manifold-to-separator flow lines. Gas is separated from liquids (e.g., water and oil) in the G/L separators 220, which can operate at a suitable pressure, for example 15 to 150 psig, alternatively 15 to 100 psig, alternatively 15 to 50 psig. Gas is recovered from the G/L separators 220 (typically from an outlet on or near the top of the separator vessel) and conveyed to a gas scrubber 240 via gas flow lines 235, which can be referred to as G/L separator-to-scrubber flow lines. Residual liquids (e.g., oil, natural gas liquids, water) are removed from the gas by the gas scrubber 240. Salable or meterable gas is recovered from the gas scrubber 240 and conveyed to gas sales meter 250 via gas flow lines 245, which can be referred to as scrubber-to-meter flow lines or gas sales flow lines.

A fluid comprising a combination of oil and water can be conveyed from G/L separators 220, from gas scrubber 240, or both to an oil-water (O/W) separator 260 via O/W flow lines 255, which can be referred to as G/L separator-to-O/W separator flow lines and/or gas scrubber-to-O/W separator flow lines. Oil and water are partially separated in the O/W separator, which can be any suitable separator such as a free water knockout drum. Free water refers to water that is not part of an oil/water emulsion and thus separates easily by gravity from the other components present (e.g., crude oil, emulsions, etc.) Water is recovered from the O/W separator 260 and is conveyed to a water tank 275 (and held for subsequent use, treatment, or disposal) via water flow lines 261, which can be referred to as O/W separator-to-water tank flow lines. A mixture of oil and water (O/W) is recovered from the O/W separator 260 and is conveyed to one or more treaters 270A and 270B via O/W flow lines 263, which can be referred to as O/W separator-to-treater flow lines. Depending upon the condition of the O/W mixture recovered from the O/W separator, all or a portion of the O/W mixture can be conveyed to different types of treaters (e.g., 270A or 270B) for additional treatment to remove water and/or gas from the oil. For example, where all or a portion of the O/W mixture exiting the O/W separator is an emulsion, the O/W mixture can be conveyed to treater 270A, for example a heater treater which uses heat to break O/W emulsions and recover oil, water, and optionally gas. Where present, gas is recovered from treater 270A and conveyed to gas sales meter 250 via flow line 247 and 245, which can be referred to as treater-to-gas meter flow lines. Oil is recovered from treater 270A and conveyed to one or more oil storage tanks 280 (also called run tanks) via oil flow line 249, which can be referred to as treater-to-run tank flow lines. Water is recovered from treater 270A and conveyed to a water tank 275 (and held for subsequent use, treatment, or disposal) via water flow lines 267 and 261, which can be referred to as treater-to-water tank flow lines.

In addition to or as an alternative to conveying the O/W mixture from O/W separator 260 to treater 270A, all or a portion of the O/W mixture from O/W separator 260 can be conveyed to treater 270B via oil flow lines 263, which can be referred to as O/W separator-to-treater flow lines. Where the O/W mixture recovered from O/W separator 260 can be further separated over time by gravity segregation forces, the treater 270B can be a settling tank such as a gun barrel separator (also referred to as a wash tank). Water is recovered from treater 270B and conveyed to a water tank 275 (and held for subsequent use, treatment, or disposal) via water flow lines 269 and 261, which can be referred to as treater-to-water tank flow lines. Oil is recovered from treater 270B and conveyed to one or more oil storage tanks 280 (also called run tanks) via oil flow line 251, which can be referred to as wash tank-to-run tank flow lines.

Oil from oil storage tanks 270 can be conveyed to LACT unit 285 via oil flow lines 283, which can be referred to oil meter flow lines. After being metered by LACT unit 285, oil (which can also be referred to as wellsite processed oil or wellsite processed crude) is conveyed to a long haul intrastate or interstate oil transmission pipeline via flow line 287, which can be referred to a meter-to-pipeline flow line. Tanks 275, 280, and 270B can have a gas recovery flow line (typically exiting the tank at or near the top thereof) to convey residual gas from the tanks to a vent, flare, or vapor recovery unit (VRU) 290 via gas flow lines 288, which can be referred to as tank-to-VRU flow lines. Gas is recovered from the VRU 290 and conveyed to a gas sales meter 252 via gas flow line 291, which can be referred to as a VRU-to-meter flow line. After being metered by gas meter 250 and/or gas meter 252, the gas (which can also be referred to as wellsite processed gas) can be conveyed to a gas processing unit (e.g., gas processing unit 30 of FIG. 1) via gas flow lines 295, which can be referred to as meter-to-processing plant flow lines. Water can be recovered from water tank 275 and subsequently used, treated, or disposed of. For example, water can be conveyed from water to 275 to water station 293 by water flow line 292, which can be referred to as a water tank-to-water station flow line. Water station 293 can be used to prepare water for injection into one or more high pressure injection wells 299, for example as part of a steam injection or water flood enhanced oil recovery process. Water and/or steam can be conveyed from water station 293 to injection header 296 via flow line 294, which can be referred to as water station-to-injection header flow lines, and from injection header 296 to a plurality of high pressure injection wells 299 via a corresponding plurality of high pressure injection well flow lines 297, which can be referred to as injection header-to-injection well flow lines. Water and/or condensed steam that is injected into the subterranean formation via the high pressure injection wells 290 can migrate across the formation (e.g., sweeping oil along therewith) and be recovered via wells 210 and processed within tank battery 200 as described herein.

Any of the flow lines shown in FIG. 2 can comprise a PVDF flow line formed from one or more sections of PVDF pipe of the type disclosed herein, one or more PVDF fittings of the type disclosed herein, or combinations thereof. For example, any of the various flow lines described in FIG. 2 can comprise a plurality of straight, solid wall PVDF pipe sections (e.g., 40 or 50 foot sections) joined together directly (e.g., butt fused as described herein) or indirectly (via one or more solid wall PVDF fittings as described herein), wherein the solid wall PVDF pipe sections, the solid wall PVDF fittings, or both have dimensions specified in Tables 3 to 5, for example the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof, and wherein the PVDF pipe sections, the PVDF fittings, or both consist essentially of, or consist of, PVDF, and wherein the various flow lines in FIG. 2 include flow lines 215 (e.g., wellhead-to-manifold flow lines), 225 (e.g., manifold-to-separator flow lines), 235 (e.g., G/L separator-to-scrubber flow lines), 245 (e.g., scrubber-to-meter flow lines), 255 (e.g., G/L separator-to-O/W separator flow lines and/or gas scrubber-to-O/W separator flow lines), 261 (e.g., O/W separator-to-water tank flow lines), 263 (e.g., O/W separator-to-treater flow lines), 247 (e.g., treater-to-gas meter flow lines), 249 (e.g., treater-to-run tank flow lines), 267 (e.g., treater-to-water tank flow lines), 269 (e.g., treater-to-water tank flow lines), 251 (e.g., wash tank-to-run tank flow lines), 283 (e.g., oil meter flow lines), 287 (e.g., meter-to-pipeline flow lines), 288 (e.g., tank-to-VRU flow lines), 291 (e.g., VRU-to-meter flow lines), 295 (e.g., meter-to-processing plant flow lines), 292 (e.g., a water tank-to-water station flow line), 294 (e.g., water station-to-injection header flow lines), 297 (e.g., injection header-to-injection well flow lines), or any combination thereof.

In an aspect, a method for transporting fluids from a wellbore comprises producing a fluid (e.g., gas and/or liquid hydrocarbons) from a wellbore penetrating a subterranean formation through a wellhead to yield produced hydrocarbons; and flowing the produced hydrocarbons through a hydrocarbon gathering system directly or indirectly (e.g., via one or more treatment systems such as an gas liquid separator and/or a gas processing plant) to a long-haul pipeline transmission system, wherein the hydrocarbon gathering system, the long-haul pipeline transmission system or both comprises solid wall PVDF pipe having a nominal pipe size of equal to or greater than 2, 4, or 6 inches and equal to or less than 36, 24, 22, 20, 18, or 16 inches (e.g., solid wall PVDF pipe of size NPS≥2 and ≤36, alternatively NPS>6 and ≤24, alternatively NPS>6 and ≤16, (e.g., as described in Tables 3 to 5)) and wherein the PVDF pipe consists essentially of, or consists of, PVDF.

In an aspect, a method for transporting fluids from a wellbore comprises producing a fluid (e.g., gas and/or liquid hydrocarbons) from a wellbore penetrating a subterranean formation through a wellhead to yield produced hydrocarbons; and flowing the produced hydrocarbons through a hydrocarbon gathering system directly or indirectly (e.g., via one or more treatment systems such as an gas liquid separator and/or a gas processing plant) to a long-haul pipeline transmission system, wherein the hydrocarbon gathering system, the long-haul pipeline transmission system or both comprise a plurality of straight, solid wall PVDF pipe sections (e.g., 40 or 50 foot sections) joined together directly (e.g., butt fused as described herein) or indirectly (via one or more PVDF fittings as described herein), wherein the solid wall PVDF pipe sections, the PVDF fittings, or both have dimensions specified in Tables 3 to 5, for example the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof, and wherein the PVDF pipes sections, the PVDF fittings, or both consist essentially of, or consist of, PVDF.

Gas gatherings system consists of low pressure, relatively small diameter pipelines (in contrast to intrastate or interstate transmission pipelines) that transport gas from the wellhead to the processing plant. Should gas from a particular well have high hydrogen sulfide and/or carbon dioxide contents (i.e., an acid gas or sour gas), a specialized sour gas gathering pipe should be installed such as the PVDF pipe described herein. Acid gas or sour gas is corrosive, thus its transportation from the wellhead to the sweetening plant must be done carefully. The gas from a gas well is collected using gathering lines that are relatively small (e.g., ≤18" diameter or ≤16" diameter) PVDF pipes that carry pressurized unodorized gas and are typically buried four feet underground. Similar to a tree branch type pattern, gas gathering lines collect gas from smaller lines and move it to a central collecting point such as a gas processing facility, storage tanks awaiting movement to the main pipeline, or marine terminal. When the quality of the gas is not suitable for the main pipeline, it is fed to a gas processing plant.

The gathering of gas comprises aggregating gas produced from various wells through relatively small diameter gathering lines (in contrast to intrastate or interstate transmission pipelines) to local or regional gas processing plants. Natural gas has a widely varying composition depending on the field, the formation and the reservoir from which it is produced. The processing of gas consists of the extraction of imbedded natural gas liquids (NGLs) and the removal of water vapor and other contaminants (e.g., hydrogen sulfide, carbon dioxide, or both) to form (i) a stream of marketable natural gas, commonly referred to as residue or dry gas, and (ii) a stream of mixed NGLs (e.g., ethane, propane, butane, pentane or heavier hydrocarbons, and combinations thereof). Once processed, the residue gas is transported to markets through long-haul intrastate and/or interstate transmission pipelines that are owned by either the gatherers and processors or third parties. The residual gas is transported to pipeline terminals, where the gas is stored or further provided to one or more end-users for use or distribution. End-users of residue gas include large commercial and industrial customers, as well as natural gas and electric utilities serving individual consumers via a vast regulated gas distribution system. Transportation of gas from the wellhead via the gathering system to a processing plant and/or through a long-haul intrastate and/or interstate transmission pipeline to a receiving terminal can be referred to as a midstream transmission system or network.

In an aspect, a method for transporting gas from a wellbore comprises flowing gas from a wellbore penetrating a subterranean formation through a wellhead to yield produced gas; flowing the produced gas through a wellhead line to one or more wellsite processing units to yield wellsite processed gas; and flowing the wellsite processed gas through a gathering line to a gas processing plant, a gas pipeline transmission system, or both, wherein the wellhead line, the gathering line, or both comprise a plurality of sections of solid wall polyvinylidene fluoride (PVDF) pipe having a nominal pipe size (NPS)≥2 and ≤36, alternatively NPS>6 and ≤24, alternatively NPS>6 and ≤16, (e.g., as described in Tables 3 to 5). The produced gas, the wellsite processed gas, or both can be flowed through a collection header (also referred to as a collection manifold), wherein all or a portion of the collection header (manifold) comprises PVDF pipe having a nominal pipe size (NPS) ≥2 and ≤36, alternatively NPS>6 and ≤24, alternatively NPS>6 and ≤16, (e.g., as described in Tables 3 to 5). The produced gas, the wellsite processed gas, or both can be compressed prior to flow through the PVDF pipe. The one or more wellsite processing units can comprise a heater, a gas-liquid separator, or both. For example, the tank battery 200 of FIG. 2 is a wellsite processing unit for wellsite processing of gas produced from wellheads 210. The produced gas is flowed through wellhead lines 215 and 225 for wellsite processing by gas-liquid separators 220, scrubber 240, and heater treater 270, each of which conveys wellsite processed gas through gathering lines 235, 245 247 and 295 to gas processing plant 30. The wellhead line, the gathering line, or both can comprise a plurality of PVDF pipe segments, wherein all or a portion of the PVDF pipe segments are connected via butt fusion. The produced gas can comprise methane, water, and one or more corrosive compounds selected from the group consisting of hydrogen sulfide, carbon dioxide, and combinations thereof. The subterranean formation comprises shale and the wellhead can be onshore, alternatively the subterranean formation comprises a landfill (for recovery of landfill generated gas) and the wellhead can be onshore.

In an aspect, a method for transporting gas from a wellbore comprises flowing gas from a wellbore penetrating a subterranean formation through a wellhead to yield produced gas; flowing the produced gas through a wellhead line to one or more wellsite processing units to yield wellsite processed gas; and flowing the wellsite processed gas through a gathering line to a gas processing plant, a gas pipeline transmission system, or both, wherein the wellhead line, the gathering line, or both comprise a plurality of straight, solid wall PVDF pipe sections (e.g., 40 or 50 foot sections) joined together directly (e.g., butt fused as described herein) or indirectly (via one or more PVDF fittings as described herein), wherein the solid wall PVDF pipe sections, the PVDF fittings, or both have dimensions specified in Tables 3 to 5, for example the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof, and wherein the PVDF pipes sections, the PVDF fittings, or both consist essentially of, or consist of, PVDF.

In an aspect, a method for transporting fluids from a wellbore comprises recovering fluid (e.g., liquids such as crude oil and water, gases such as raw natural gas, or multi-phase fluids containing both gases and liquids) from a wellbore penetrating a subterranean formation through a wellhead to yield a recovered fluid; and flowing the recovered fluid through (i) a gathering system conveying the recovered fluid from the wellhead to a processing unit to produce a processed fluid, (ii) a pipeline transmission system transporting the processed fluid from the processing unit to a distribution point or a storage facility; (iii) a distribution system distributing the processed fluid from the distribution point or storage facility to one or more end users; or (iv) combinations thereof, wherein the gathering system, the pipeline transmission system, the distribution system, or combinations thereof comprise solid wall PVDF pipe consisting essentially of, or consisting of, PVDF, wherein the processed fluid is natural gas and wherein the pipeline transmission system, the distribution system, or both comprise one or more flow lines comprising PVDF pipe having an SDR of 7 and a maximum operating pressure (MOP) of 666 psig, an SDR of 9 and a MOP of 500, an SDR of 11 and a MOP of 400, an SDR of 17 and a MOP of 250, an SDR of 21 and a MOP of 200, or a SDR of 26 and a MOP of 160, wherein the MOP is determined according to the equation:

MOP=[2(HDB)(DF)/(SDR−1)], where MOP is maximum operating pressure in psig, HDB is hydrostatic design basis in psi as determined in accordance with ASTM Test Method D2837 at a temperature of 73° F.=5000 psi, DF is the service deign factor=0.4 for regulated natural gas distribution systems, and SDR is standard dimension ratio which is the outside diameter of the pipe in inches divided by the pipe minimum wall thickness in inches.

In an aspect, a method for transporting fluids from a wellbore comprises recovering fluid (e.g., liquids such as hydrocarbons and water, gases such as raw natural gas, or multi-phase fluids containing both gases and liquids) from a wellbore penetrating a subterranean formation through a wellhead to yield a recovered fluid; and flowing the recovered fluid through (i) a gathering system conveying the recovered fluid from the wellhead to a processing unit to produce a processed fluid, (ii) a pipeline transmission system transporting the processed fluid from the processing unit to a distribution point or a storage facility; (iii) a distribution system distributing the processed fluid from the distribution point or storage facility to one or more end users; or (iv) combinations thereof, wherein the gathering system, the pipeline transmission system, the distribution system, or combinations thereof comprise solid wall PVDF pipe consisting essentially of, or consisting of, PVDF, wherein the processed fluid is natural gas and wherein the pipeline transmission system, the distribution system, or both comprise one or more flow lines comprising PVDF pipe having an SDR of 7 and a maximum operating pressure (MOP) of 666 psig at an HDB of 5000 psi and a temperature of 73° F., a MOP of 166 psig at an HDB of 1250 psi and a temperature of 248° F., or a MOP of 106 psig at an HDB of 800 psi and a temperature of 284° F., wherein the MOP is determined according to the equation:

MOP=[2(HDB)(DF)/(SDR−1)], where MOP is maximum operating pressure in psig, HDB is hydrostatic design basis in psi as determined in accordance with ASTM Test Method D2837, DF is the service deign factor=0.4 for regulated natural gas transmission or distribution systems, and SDR is standard dimension ratio which is the outside diameter of the pipe in inches divided by the pipe minimum wall thickness in inches.

In an aspect, a method for transporting fluids from a wellbore comprises recovering fluid (e.g., liquids such as hydrocarbons and water, gases such as raw natural gas, or multi-phase fluids containing both gases and liquids) from a wellbore penetrating a subterranean formation through a wellhead to yield a recovered fluid; and flowing the recovered fluid through (i) a gathering system conveying the recovered fluid from the wellhead to a processing unit to produce a processed fluid, (ii) a pipeline transmission system transporting the processed fluid from the processing unit to a distribution point or a storage facility; (iii) a distribution system distributing the processed fluid from the distribution point or storage facility to one or more end users; or (iv) combinations thereof, wherein the gathering system, the pipeline transmission system, the distribution system, or combinations thereof comprise solid wall PVDF pipe consisting essentially of, or consisting of, PVDF, wherein the recovered fluid is natural gas and wherein the gathering system comprises one or more flow lines comprising PVDF pipe having an SDR of 7 and a maximum operating pressure (MOP) of 1050 psig at an HDB of 5000 psi and a temperature of 73° F., a MOP of 262 psig at an HDB of 1250 psi and a temperature of 248° F., or a MOP of 168 psig at an HDB of 800 psi and a temperature of 284° F., wherein the MOP is determined according to the equation:

MOP=[2(HDB)(DF)/(SDR−1)], where MOP is maximum operating pressure in psig, HDB is hydrostatic design basis in psi as determined in accordance with ASTM Test Method D2837, DF is the service design factor=0.63 for unregulated oil and gas gathering systems or non-hazardous liquid pipelines, and SDR is standard dimension ratio which is the outside diameter of the pipe in inches divided by the pipe minimum wall thickness in inches. For regulated oil and gas gathering and transmission systems or hazardous liquid pipelines the design factor, DF=0.4.

Any of the PVDF flow lines described herein, for example and without limitation those used in an oil and gas gathering system, long-haul intrastate or interstate transmission pipeline system, or distribution system (e.g., as shown in FIG. 1 or 2), can be installed by a method comprising: (i) determining pipe performance requirements (e.g., flow rate, pressure, fluid being transported, flow path, etc.) based upon the intended service of the PVDF flow line (for example, based upon a piping and instrumentation diagram (P&ID) of the PVDF flow line prepared by a person of ordinary skill such as a pipeline engineer); (ii) based upon the pipe performance requirements selecting the appropriate components of PVDF pipe (e.g., based on the dimensions and pressure ratings set forth in Tables 3 to 5), PVDF fittings, or both needed to assemble the PVDF flow line; (iii) preparing the installation site as needed (e.g., digging trenches for underground installations, preparing pipe support structures for above ground installations, removal of excess or out of service equipment, removal of all or a portion of an existing (e.g., damaged) flow line that is to be replaced, etc.); (iv) assembling the PVDF flow line from the PVDF pipe components (e.g., 50 ft straight sections of solid wall PVDF pipe of the type described herein), the PVDF fitting components (e.g., solid wall PVDF fittings of the type described herein), or combinations thereof, for example via heat fusion of the PVDF pipe and/or PVDF fitting components, wherein the assembling includes connecting the PVDF flow line to a source (e.g., a wellhead) and a destination (e.g., a gas processing plant); (v) pressure and/or leak testing the PVDF flow line; and (vi) placing the PVDF flow line in service by flowing a fluid such as oil and/or gas recovered from a wellbore through the PVDF flow line from the wellhead to the destination.

Any flow lines described herein, for example and without limitation conventional flow lines (e.g., metallic flow lines such as steel or aluminum) used in an oil and gas gathering system, long-haul intrastate or interstate transmission pipeline system, or distribution system (e.g., as shown in FIG. 1 or 2), can be removed and replaced by a method comprising: (i) identifying one or more conventional (e.g., non-PVDF) flow lines of the type described herein including without limitation one or more conventional (e.g., non-PVDF) flow lines (e.g., metallic flow lines such as steel or aluminum flow lines) in an oil and gas gathering system, long-haul intrastate or interstate transmission pipeline system, or distribution system (e.g., as shown in FIG. 1 or 2), that are currently in service or have previously been in service, and are now in need of replacement (e.g., having reached an end of service life due to age, corrosion, metal fatigue, cracking, reduced wall thickness, leaks, rupture, integrity testing failure, etc.); (ii) if applicable, discontinuing service of the one or more conventional flow lines (e.g., discontinuing the flow of fluid such as oil and/or gas through the conventional flow line) that is need of replacement; (iii) physically removing all or a portion of the one or more conventional flow lines that is need of replacement; (iv) determining pipe performance requirements (e.g., flow rate, pressure, fluid being transported, flow path, etc.) based upon the intended service of a replacement PVDF flow line (for example, based upon a piping and instrumentation diagram (P&ID) of the PVDF flow line prepared by a person of ordinary skill such as a pipeline engineer); (v) based upon the pipe performance requirements selecting the appropriate components of PVDF pipe (e.g., based on the dimensions and pressure ratings set forth in Tables 3 to 5), PVDF fittings, or both needed to assemble the replacement PVDF flow line; (vi) preparing the installation site as needed (e.g., digging trenches for underground installations, preparing pipe support structures for above ground installations, removal of existing out of service equipment (e.g., all or a portion of a damaged conventional flow line) in addition to or as a substitute for step (iii) above, etc.); (vii) assembling the replacement PVDF flow line from the PVDF pipe components (e.g., 50 ft straight sections of solid wall PVDF pipe of the type described herein), the PVDF fitting components (e.g., solid wall PVDF fittings of the type described herein), or combinations thereof, for example via heat fusion of the PVDF pipe and/or PVDF fitting components, wherein the assembling includes connecting the replacement PVDF flow line to a source (e.g., a wellhead or undamaged portion of existing flow line) and a destination (e.g., a gas processing plant or undamaged portion of existing flow line); (viii) pressure and/or leak testing the replacement PVDF flow line; and (ix) placing the replacement PVDF flow line in service by flowing a fluid such as oil and/or gas recovered from a wellbore through the replacement PVDF flow line from the wellhead to the destination.

EXAMPLES

Example 1

PVDF Chemical Resistance to Crude Oil

The chemical resistance of SOLEF PVDF to crude oil was considered in: (i) typical service consisting in mostly non-aromatic hydrocarbons (maximum 5% aromatics), chlorides, carbon dioxide, hydrogen sulfide and carbonates at pH 4-6 up to 60° C.; and (ii) "pain points" service with high chloride and hydrogen sulfide contents up to 120° C.

Internal tests in crude oil show that PVDF is resistant even above 120° C. No relevant swelling was observed in immersion tests at 125° C. and no decrease in maximum admissible stress compared to a non-aggressive medium for the polymer as water was observed in bursting tests at 150° C. (see below for further details).

In the typical service conditions mentioned, the resistance of PVDF is expected to be even better than the general resistance to crude oil due to the low aromatic content. Moreover, PVDF is resistant to chlorides, carbon dioxide, hydrogen sulfide and carbonates at pH 4-6 up to 60° C.

Also in "pain points" service, PVDF is expected to be resistant. High chloride content is not critical for PVDF since in relevant literature PVDF is reported to be resistant in concentrated chloride solutions up to 135° C. Regarding hydrogen sulfide, investigations performed by external laboratories show that no significant alterations of PVDF occur when exposed to 64% H2S at 130° C., and only some discoloration was observed due to the well-known partial degradation of residues from polymerization in acid environments, which do not have any influence on the polymer performance during service.

Hence basing on the available data, the chemical resistance of PVDF, e.g., SOLEF, is expected to be satisfactory in crude oil, both in typical service and in "pain points".

Hereafter is the available data concerning SOLEF PVDF behavior in contact with crude oil.

Immersion test was performed with 100% crude oil at various temperatures as set forth below. An increase of the weight of +0.7% after 30 days was observed. The PVDF achieved a "+" rating at each temperature.

| | | | Temperature ° C. | | | | |
|---|---|---|---|---|---|---|---|
| Medium | Formula | Conc. | 25 | 50 | 75 | 100 | 125 |
| Crude Oil | | 100% | + | + | + | + | + |

A "+" rating means: SOLEF PVDF is resistant. The increase in the weight is 2% or less. Any reduction in the weight is less than 0.3%. The tensile yield strength has not altered by more than 15% from its initial value.

A "O" rating means: Use of SOLEF PVDF is limited. The response to one of the criteria above is negative. For instance, the increase in the weight is between 2% and 5%. However, SOLEF PVDF can be used in the medium, provided that it is not submitted to undue stress (linings, reinforced or supported structures).

A "−" rating means: SOLEF PVDF is not resistant. There is a considerable alteration to the SOLEF PVDF: dissolution, chemical or physical degradation. For instance, the increase in the weight is greater than 5%.

Bursting test in the Console DECHEMA at 150° C. with a 100% crude oil was performed:

| 100% crude petrol at 150° C. | |
|---|---|
| Hoop stress σ max, MPa | Time before rupture, h |
| 5.9 | 1.1 |
| 5.6 | 2.2 |
| 5.6 | Stopped after 2200 h |
| 5.4 | Stopped after 2200 h |

The above results show that there is no relevant reduction in maximum hoop stress without breaks compared to water, i.e. a non-aggressive medium for the polymer.

In an aspect, the PVDF pipe has a crude oil chemical design factor ($DF_C$) of 1.0 for PVDF pipe applications with up to 100% crude oil with temperatures up to 300° F. (150° C.), wherein pipe samples were tested with a hoop stress of 5.5 MPa at 300° F. (150° C.) with 100% crude oil on the inside and had no failures before 2000 hours.

Example 2

PVDF Gas Permeability

Regarding gas permeation, below are the permeability coefficients measured according to ASTM D1434 on methane, carbon dioxide and hydrogen sulfide in SOLEF PVDF at 120° C. from a gas mixture of 85% $CH_4$/5% $CO_2$/10% $H_2S$/400 ppm $H_2O$ at 100 bar pressure using 6 mm thick samples.

| COMPONENT | P [$cm^3$(STP) · mm/$m^2$ · atm · d] |
|---|---|
| CH4 | 210 |
| CO2 | 690 |
| H2S | 520 |

Example 3

Resistance to Slow Crack Growth

Slow crack growth (SCG) is a failure mechanism that can occur in the field with certain materials in certain circumstances. SCG resistance is a key material property of plastic piping materials because it is a factor in determining the pipe's long-term performance. When higher operating pressures or larger diameter pipes are being considered, SCG resistance is even more important.

During rehabilitation or other installation techniques, pipes can be scored, scratched or damaged on the outside surface. These external scratches could lead to slow crack growth and eventual failure of the pipe, unless the pipe has very high resistance to SCG. The higher SCG resistance of PVDF pipes results in substantially improved long-term performance. This is especially important as PVDF pipes are used in higher-pressure and higher-temperature applications.

Figure 3:
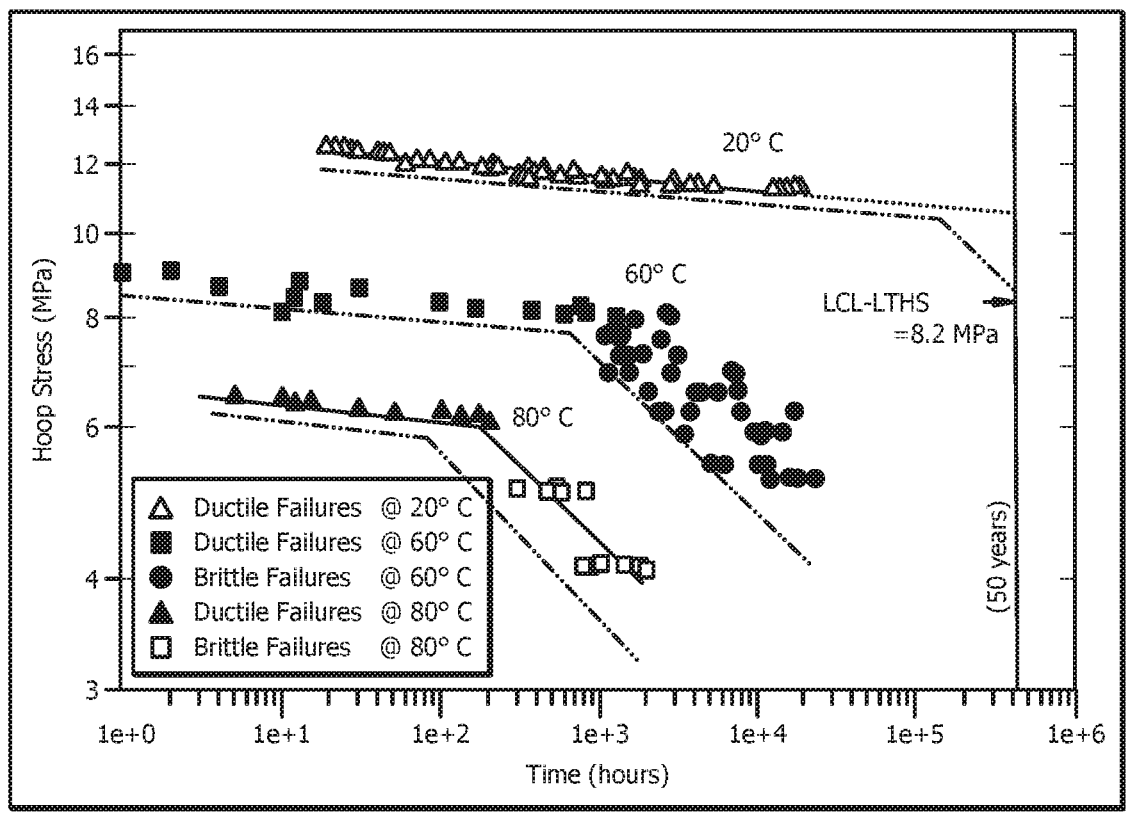
FIG. 3 is a generic ASTM D2837 plot of hoop stress (MPa) as a function of time (hours) for an unspecified material as discussed in Example 3.

In ASTM D2837 stress rupture curves, the log-stress vs log time regression curve is generally linear over the range of ductile failures. For some thermoplastic pipe materials, the failure mode changes from the ductile to brittle or slit at longer times and lower stress. This is the SCG failures mode and it has a steeper slope compared to the ductile failure mode slope. This is sometimes referred to as the "knee" in the stress rupture curve as shown in FIG. 3 as an example. For the unspecified material shown in FIG. 3, there are only ductile failures at 20° C. However, both ductile failures and brittle failures are observed at both 60° C. and 80° C. for the unspecified material shown in FIG. 3. Note the steeper slope for the brittle data, and the corresponding knee or change in slope for the regression line at each of these elevated temperatures.

Figure 4:
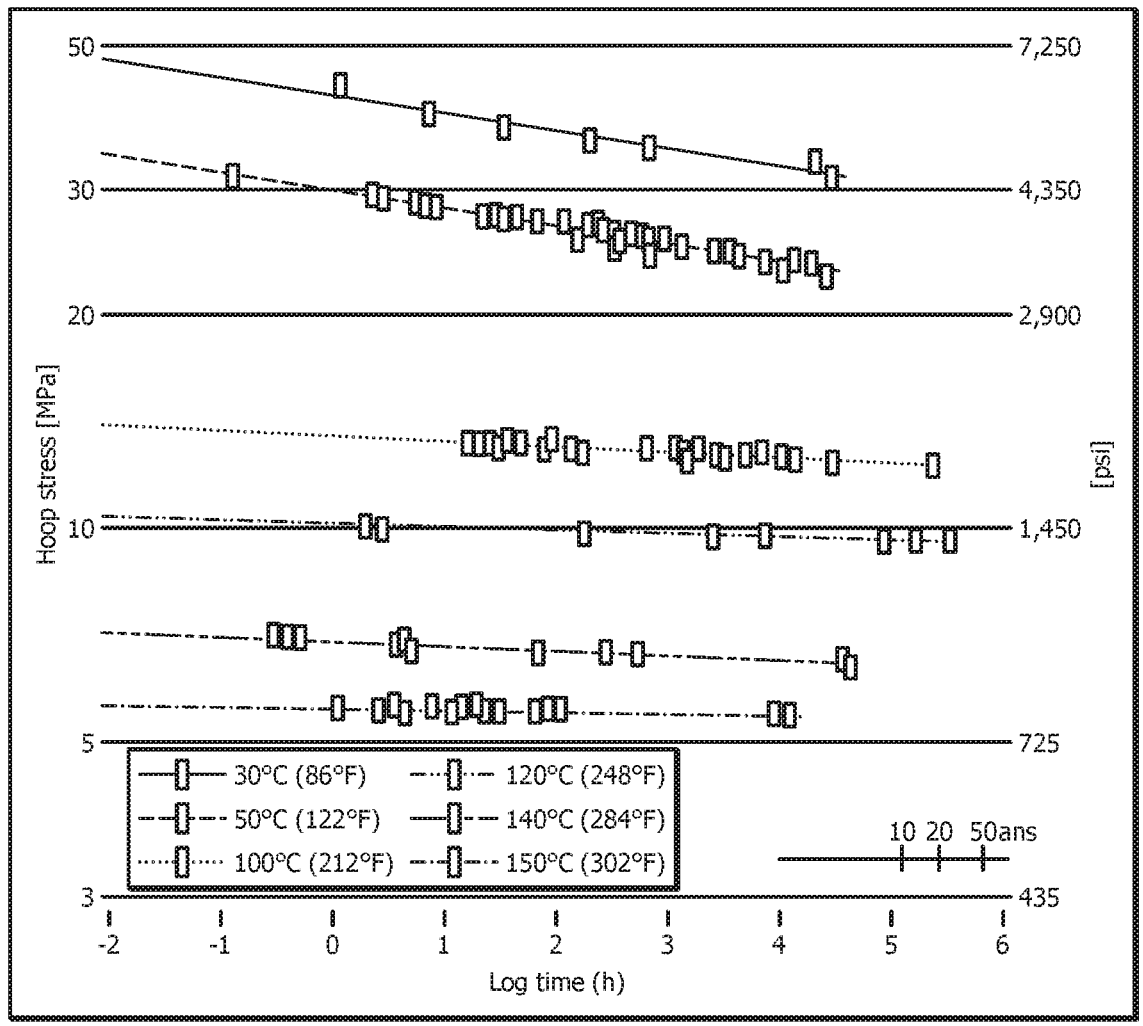
FIG. 4 is an ASTM D2837 plot of hoop stress (MPa) as a function of time (hours) for PVDF 2025 as discussed in Example 3.

PVDF 2025 material has extremely high resistance to SCG as evidenced by its long-term stress rupture data. FIG. 4 is a plot of ASTM D2837 stress regression test results at six various temperatures for PVDF 2025. These include 30, 50, 100, 120, 140, and 150° C. in FIG. 4. Note that for every temperature up to 150° C., there is no knee in the curve, thus there are no brittle or SCG failures. Accordingly the PVDF pipe comprising PVDF 2025 is expected to display linear stress rupture curves as determined in accordance with ASTM D2837 at 86° F., 122° F., 212° F., 248° F., 284° F., and 302° F., and more specifically the PVDF pipe comprising PVDF 2025 is expected to display a linear stress rupture curve as determined in accordance with ASTM D2837 at 248° F. over a time period of from about 25 years extrapolated to about 2000 years.

Using LTHS extrapolation methodology, based on the longest data point (25 years) for the 120° C. regression line, we can project that the knee at 20° C. will not occur for over 2000 years. Thus, the slow crack growth failure mode is not a concern for the PVDF 2025 material.

Additional Disclosure

A first aspect which is a method comprising: flowing gas from a wellbore penetrating a subterranean formation through a wellhead to yield produced gas; flowing the produced gas through a wellhead line to one or more wellsite processing units to yield wellsite processed gas; and flowing the wellsite processed gas through a gathering line to a gas processing plant, a gas pipeline transmission system, or both, wherein the wellhead line, the gathering line, or both comprise polyvinilydene fluoride (PVDF) pipe having a nominal pipe size of equal to or greater than 2 inches and equal to or less than 16 inches.

A second aspect which is the method of the first aspect further comprising flowing the produced gas, the wellsite processed gas, or both through a collection header, wherein all or a portion of the collection header comprises PVDF pipe having a nominal pipe size of equal to or greater than 2 inches and equal to or less than 16 inches.

A third aspect which is the method of the first or second aspect, wherein the flowing the produced gas, the wellsite processed gas, or both are compressed prior to flow through the PVDF pipe.

A fourth aspect which is the method of any one of the first through third aspects, wherein the one or more wellsite processing units comprise a heater, a gas-liquid separator, or both.

A fifth aspect which is the method of any one of the first through fourth aspects, wherein the wellhead line, the gathering line, or both comprise a plurality of PVDF pipe segments, wherein all or a portion of the PVDF pipe segments are connected via butt fusion.

A sixth aspect which is the method of any one of the first through fifth aspects, wherein the produced gas comprises methane, water, and one or more corrosive compounds selected from the group consisting of hydrogen sulfide, carbon dioxide, and combinations thereof.

A seventh aspect which is the method of any one of the first through sixth aspects, wherein the subterranean formation comprises shale and the wellhead is onshore.

An eighth aspect which is the method of any one of the first through seventh aspects, where the PVDF pipe has an operating temperature ranging from −40° F. to 284° F., alternatively 73° F. to 284° F.

A ninth aspect which is the method of any one of the first through eighth aspects, wherein the PVDF pipe has an operating pressure selected from the group consisting of a range of from greater than 0 psig to equal to or less than 1050 psig for unregulated PVDF pipe having an SDR of 7; a range of from greater than 0 psig to equal to or less than 630 psig for unregulated PVDF pipe having an SDR of 11; a range of from greater than 0 psig to equal to or less than 650 psig for regulated PVDF pipe having an SDR of 7; and a range of from greater than 0 psig to equal to or less than 400 psig for regulated PVDF pipe having an SDR of 11.

A tenth aspect which is the method of any one of the first through ninth aspects, wherein the PVDF pipe is solid wall pipe.

An eleventh aspect which is the method of any one of the first through tenth aspects, wherein the PVDF pipe consists essentially of, or consists of, PVDF.

A twelfth aspect which is the method of any one of the first through eleventh aspects, wherein the PVDF has properties set forth in Table 1 or Table 2.

A thirteenth aspect which is the method of any one of the first through twelfth aspects, wherein the PVDF pipe has dimensions set forth in Table 3, Table 4, or Table 5.

A fourteenth aspect which is the method of any one of the first through thirteenth aspects, wherein the PVDF pipe has a pressure rating set forth in Table 8.

A fifteenth aspect which is the method of any one of the first through fourteenth aspects, wherein the PVDF pipe (i) displays a linear stress rupture curve as determined in accordance with ASTM D2837 at 248° F. over a time period of from about 25 years extrapolated to about 2000 years; (ii) shall not fail before 2000 hours when tested in accordance with Test Method ASTM F1473 using compression molded plaques at a stress of 7.5 MPa, based on the unnotched area, and a test temperature of 80° C.; or both (i) and (ii).

A sixteenth aspect which is a method comprising: producing acid gas from a wellbore penetrating a subterranean formation through a wellhead to yield produced acid gas, wherein the produced acid gas comprises methane, water, and one or more corrosive compounds selected from the group consisting of hydrogen sulfide, carbon dioxide, and combinations thereof; and flowing the produced acid gas through a gas gathering system to a gas processing facility to reduce the acidity of the acid gas and yield treated natural gas, wherein the treated natural gas has less hydrogen sulfide, carbon dioxide, or both than the produced acid gas, wherein the gas gathering system comprises one or more flow lines comprising PVDF pipe having a nominal pipe size of equal to or greater than 2 inches and equal to or less than 16 inches.

A seventeenth aspect which is the method of the sixteenth aspect, wherein the PVDF pipe consists essentially of PVDF.

An eighteenth aspect which is a method comprising: recovering fluid from a wellbore penetrating a subterranean formation through a wellhead to yield a recovered fluid; and flowing the recovered fluid through (i) a gathering system conveying the recovered fluid from the wellhead to a processing unit to produce a processed fluid, (ii) a pipeline transmission system transporting the processed fluid from the processing unit to a distribution point or a storage facility, (iii) a distribution system distributing the processed fluid from the distribution point or storage facility to one or more end users, or (iv) combinations thereof, wherein the gathering system, the pipeline transmission system, the distribution system, or combinations thereof comprise one or more flow lines comprising PVDF pipe having a nominal pipe size of equal to or greater than 2 inches and equal to or less than 36 inches.

A nineteenth aspect which is the method of the eighteenth aspect, wherein the recovered fluid comprises gaseous hydrocarbons, liquid hydrocarbons, water, carbon dioxide, hydrogen sulfide, or combinations thereof or wherein the recovered fluid comprises crude oil, raw natural gas, wet natural gas, dry natural gas, shale gas, acid gas, sour gas, natural gas liquids, produced water, injection steam condensate, fracturing fluid, or combinations thereof.

A twentieth aspect which is the method of any one of the eighteenth through nineteenth aspects, wherein the processed fluid is natural gas and wherein the pipeline transmission system, the distribution system, or both comprises PVDF pipe having an SDR of 7 and a maximum operating pressure (MOP) of 666 psig, an SDR of 9 and a MOP of 500, an SDR of 11 and a MOP of 400, an SDR of 17 and a MOP of 250, an SDR of 21 and a MOP of 200, or a SDR of 26 and a MOP of 160, wherein the MOP is determined according to the equation:

$$MOP=[2(HDB)(DF)/(SDR-1)],$$

where MOP is maximum operating pressure in psig, HDB is hydrostatic design basis in psi as determined in accordance with ASTM Test Method D2837 at a temperature of 73° F.=5000 psi, DF is the deign factor=0.4 for regulated natural gas distribution systems, and SDR is standard dimension ratio which is the outside diameter of the pipe in inches divided by the pipe minimum wall thickness in inches.

A twenty-first aspect which is the method of any one of the eighteenth through nineteenth aspects, wherein the processed fluid is natural gas and wherein the pipeline transmission system, the distribution system, or both comprises PVDF pipe having an SDR of 7 and a maximum operating pressure (MOP) of 666 psig at an HDB of 5000 psi and a temperature of 73° F., a MOP of 166 psig at an HDB of 1250 psi and a temperature of 248° F., or a MOP of 106 psig at an HDB of 800 psi and a temperature of 284° F., wherein the MOP is determined according to the equation:

$$MOP=[2(HDB)(DF)/(SDR-1)],$$

where MOP is maximum operating pressure in psig, HDB is hydrostatic design basis in psi as determined in accordance with ASTM Test Method D2837, DF is the deign factor=0.4 for regulated natural gas distribution systems, and SDR is standard dimension ratio which is the outside diameter of the pipe in inches divided by the pipe minimum wall thickness in inches.

A twenty-second aspect which is the method of any one of the eighteenth through nineteenth aspects, wherein the recovered fluid is natural gas and wherein the gathering system comprises PVDF pipe having an SDR of 7 and a maximum operating pressure (MOP) of 1050 psig at an HDB of 5000 psi and a temperature of 73° F., a MOP of 262 psig at an HDB of 1250 psi and a temperature of 248° F., or a MOP of 168 psig at an HDB of 800 psi and a temperature of 284° F., wherein the MOP is determined according to the equation:

$$MOP=[2(HDB)(DF)/(SDR-1)],$$

where MOP is maximum operating pressure in psig, HDB is hydrostatic design basis in psi as determined in accordance with ASTM Test Method D2837, DF is the deign factor=0.63 for unregulated gas gathering systems, and SDR is standard dimension ratio which is the outside diameter of the pipe in inches divided by the pipe minimum wall thickness in inches.

A twenty-third aspect which is a method comprising: producing hydrocarbons from a wellbore penetrating a subterranean formation through a wellhead to yield produced hydrocarbons; and flowing the produced hydrocarbons through a hydrocarbon gathering system to a pipeline transmission system, wherein the hydrocarbon gathering system, the pipeline transmission system or both comprise one or more flow lines comprising PVDF pipe having a nominal pipe size of equal to or greater than 2 inches and equal to or less than 36 inches and wherein the PVDF pipe consists essentially of PVDF.

A twenty-fourth aspect which is an oil and gas gathering system, long-haul intrastate or interstate transmission pipeline system, or distribution system, for example as shown in FIG. 1 or 2, wherein all or a portion of at least one flow line therein comprises a PVDF flow line formed from PVDF pipe as described herein, PVDF fittings as described herein, or both.

A twenty-fifth aspect which is the oil and gas gathering system, long-haul intrastate or interstate transmission pipeline system, or distribution system of the twenty-fourth aspect, wherein the PVDF flow line comprises a plurality of straight, solid wall PVDF pipe sections (e.g., 40 or 50 foot sections) joined together directly (e.g., butt fused as described herein) or indirectly (via one or more PVDF fittings as described herein), wherein the solid wall PVDF pipe sections, the PVDF fittings, or both have dimensions specified in Tables 3 to 5, for example the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof, and wherein the PVDF pipes sections, the PVDF fittings, or both consist essentially of, or consist of, PVDF.

A twenty-sixth aspect which is a PVDF flow line in an oil and gas gathering system, long-haul intrastate or interstate transmission pipeline system, or distribution system, for example as shown in FIG. 1 or 2, wherein the PVDF flow line is formed from PVDF pipe as described herein, PVDF fittings as described herein, or both, wherein the PVDF pipe, the PVDF fittings, or both comprise, alternatively consist essentially of, alternatively consist of, PVDF.

A twenty-seventh aspect which is a PVDF flow line in a hazardous material transmission system, a refined product transmission system, a chemical product transmission system, wherein the PVDF flow line is formed from PVDF pipe as described herein, PVDF fittings as described herein, or both, wherein the PVDF pipe, the PVDF fittings, or both comprise, alternatively consist essentially of, alternatively consist of, PVDF.

A twenty-eighth aspect which is the PVDF flow line of the twenty-sixth or twenty-seventh aspect, comprising a plurality of straight, solid wall PVDF pipe sections (e.g., 40 or 50 foot sections) joined together directly (e.g., butt fused as described herein) or indirectly (via one or more PVDF fittings as described herein), wherein the solid wall PVDF pipe sections, the PVDF fittings, or both have dimensions specified in Tables 3 to 5, for example the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof, and wherein the PVDF pipes sections, the PVDF fittings, or both consist essentially of, or consist of, PVDF.

A twenty-ninth aspect which is a method of making a PVDF flow line comprising joining, for example via heat fusion, PVDF pipe as described herein, PVDF fittings as described herein, or both, wherein the PVDF pipe, the PVDF fittings, or both comprise, alternatively consist essentially of, alternatively consist of, PVDF.

A thirtieth aspect which is the method of the twenty-ninth aspect, wherein the PVDF flow line comprises a plurality of straight, solid wall PVDF pipe sections (e.g., 40 or 50 foot sections) joined together directly (e.g., butt fused as described herein) or indirectly (via one or more PVDF fittings as described herein), wherein the solid wall PVDF pipe sections, the PVDF fittings, or both have dimensions specified in Tables 3 to 5, for example the solid wall PVDF pipes are size NPS≥2 and ≤36, alternatively NPS>6 and ≤24, alternatively NPS>6 and ≤16, (e.g., as described in Tables 3 to 5) in 40 foot or 50 foot straight sections and/or the solid wall PVDF fittings correspond to PVDF pipe of size NPS≥2 and ≤36, alternatively NPS>6 and ≤24, alternatively NPS>6 and ≤16, (e.g., as described in Tables 3 to 5) and can be selected from the group consisting of tees, elbows, flanges, 3-way fittings, 4-way fittings, 5-way fittings, connectors, reducers, expanders, couplings, nipples, and any combination thereof, and wherein the PVDF pipes sections, the PVDF fittings, or both consist essentially of, or consist of, PVDF A thirty-first aspect which is PVDF pipe, PVDF fittings, or both as described herein, wherein the PVDF pipe, the PVDF fittings, or both comprise, alternatively consist essentially of, alternatively consist of, PVDF.

A thirty-second aspect which is the PVDF pipe of the thirty-first aspect, comprising one or more straight, solid wall PVDF pipe sections (e.g., 40 or 50 foot sections) having dimensions specified in Tables 3 to 5, for example the solid wall PVDF pipe sections having size NPS≥2 and ≤36, alternatively NPS>6 and ≤24, alternatively NPS>6 and ≤16, (e.g., as described in Tables 3 to 5) in 40 foot or 50 foot straight sections, and wherein the PVDF pipes sections consist essentially of, or consist of, PVDF.

What is claimed is:

1. A method comprising:
    flowing gas from a wellbore penetrating a subterranean formation through a wellhead to yield produced gas;
    flowing the produced gas through a wellhead line to one or more wellsite processing units to yield wellsite processed gas; and
    flowing the wellsite processed gas through a gathering line to a gas processing plant, a gas pipeline transmission system, or both,
    wherein the wellhead line, the gathering line, or both comprise a plurality of polyvinylidene fluoride (PVDF) pipe segments having a nominal pipe size of equal to or greater than 2 inches and equal to or less than 16 inches, wherein all or a portion of the PVDF pipe segments are connected via butt fusion, and wherein the PVDF pipe segments consists essentially of PVDF.

2. The method of claim 1 further comprising flowing the produced gas, the wellsite processed gas, or both through a collection header, wherein all or a portion of the collection header comprises PVDF pipe segments having a nominal pipe size of equal to or greater than 2 inches and equal to or less than 16 inches.

3. The method of claim 1 wherein the produced gas, the wellsite processed gas, or both are compressed prior to flow through the PVDF pipe segments.

4. The method of claim 1 wherein the one or more wellsite processing units comprise a heater, a gas-liquid separator, or both.

5. The method of claim 1 wherein the produced gas comprises methane, water, and one or more corrosive compounds selected from the group consisting of hydrogen sulfide, carbon dioxide, and combinations thereof.

6. The method of claim 1 wherein the subterranean formation comprises shale and the wellhead is onshore.

7. The method of claim 1 where the PVDF pipe segments have an operating temperature ranging from −40° F. to 284° F.

8. The method of claim 1 where the PVDF pipe segments have an operating temperature ranging from 73° F. to 284° F.

9. The method of claim 1 wherein the PVDF pipe segments have an operating pressure selected from the group consisting of a range of from greater than 0 psig to equal to or less than 1050 psig for unregulated PVDF pipe segments having a standard dimension ratio (SDR) of 7; a range of from greater than 0 psig to equal to or less than 630 psig for unregulated PVDF pipe segments having an SDR of 11; a range of from greater than 0 psig to equal to or less than 650 psig for regulated PVDF pipe segments having an SDR of 7; and a range of from greater than 0 psig to equal to or less than 400 psig for regulated PVDF pipe segments having an SDR of 11.

10. The method of claim 1 wherein the PVDF pipe segments (i) display a linear stress rupture curve as determined in accordance with ASTM D2837 at 248° F. over a time period of from about 25 years extrapolated to about 2000 years; (ii) shall not fail before 2000 hours when tested in accordance with Test Method ASTM F1473 using compression molded plaques at a stress of 7.5 MPa, based on an unnotched area, and a test temperature of 80° C.; or both (i) and (ii).

11. A method comprising:
flowing gas from a wellbore penetrating a subterranean formation through a wellhead to yield produced gas;
flowing the produced gas through a wellhead line to one or more wellsite processing units to yield wellsite processed gas; and
flowing the wellsite processed gas through a gathering line to a gas processing plant, a gas pipeline transmission system, or both,
wherein the wellhead line, the gathering line, or both comprise a plurality of polyvinylidene fluoride (PVDF) pipe segments having a nominal pipe size of equal to or greater than 2 inches and equal to or less than 16 inches,
wherein the PVDF pipe segments have an operating temperature ranging from −40° F. to 284° F., and
wherein the PVDF pipe segments consist essentially of PVDF.

12. The method of claim 11, wherein the PVDF pipe segments have an operating temperature ranging from 73° F. to 284° F.

13. The method of claim 11 wherein all or a portion of the PVDF pipe segments are connected via butt fusion.

14. The method of claim 11 further comprising flowing the produced gas, the wellsite processed gas, or both through a collection header, wherein all or a portion of the collection header comprises PVDF pipe segments having a nominal pipe size of equal to or greater than 2 inches and equal to or less than 16 inches,
wherein the produced gas, the wellsite processed gas, or both are compressed prior to flow through the PVDF pipe segments,
wherein the one or more wellsite processing units comprise a heater, a gas-liquid separator, or both,
wherein the produced gas comprises methane, water, and one or more corrosive compounds selected from the group consisting of hydrogen sulfide, carbon dioxide, and combinations thereof, and
wherein the subterranean formation comprises shale and the wellhead is onshore.

15. A method comprising:
flowing gas from a wellbore penetrating a subterranean formation through a wellhead to yield produced gas;
flowing the produced gas through a wellhead line to one or more wellsite processing units to yield wellsite processed gas; and
flowing the wellsite processed gas through a gathering line to a gas processing plant, a gas pipeline transmission system, or both,
wherein the wellhead line, the gathering line, or both comprise a plurality of polyvinylidene fluoride (PVDF) pipe segments having a nominal pipe size of equal to or greater than 2 inches and equal to or less than 16 inches,
wherein the PVDF pipe segments have an operating pressure selected from the group consisting of a range of from greater than 0 psig to equal to or less than 1050 psig for unregulated PVDF pipe segments having a standard dimension ratio (SDR) of 7; a range of from greater than 0 psig to equal to or less than 630 psig for unregulated PVDF pipe segments having an SDR of 11; a range of from greater than 0 psig to equal to or less than 650 psig for regulated PVDF pipe segments having an SDR of 7; and a range of from greater than 0 psig to equal to or less than 400 psig for regulated PVDF pipe segments having an SDR of 11, and
wherein the PVDF pipe segments consist essentially of PVDF.

16. The method of claim 15 wherein all or a portion of the PVDF pipe segments are connected via butt fusion.

17. The method of claim 15 further comprising flowing the produced gas, the wellsite processed gas, or both through a collection header, wherein all or a portion of the collection header comprises PVDF pipe segments having a nominal pipe size of equal to or greater than 2 inches and equal to or less than 16 inches,
wherein the produced gas, the wellsite processed gas, or both are compressed prior to flow through the PVDF pipe segments,
wherein the one or more wellsite processing units comprise a heater, a gas-liquid separator, or both,
wherein the produced gas comprises methane, water, and one or more corrosive compounds selected from the group consisting of hydrogen sulfide, carbon dioxide, and combinations thereof, and
wherein the subterranean formation comprises shale and the wellhead is onshore.

18. A method comprising:
recovering fluid from a wellbore penetrating a subterranean formation through a wellhead to yield a recovered fluid; and
flowing the recovered fluid through (i) a gathering system conveying the recovered fluid from the wellhead to a processing unit to produce a processed fluid, (ii) a pipeline transmission system transporting the processed fluid from the processing unit to a distribution point or a storage facility; (iii) a distribution system distributing the processed fluid from the distribution point or storage facility to one or more end users; or (iv) combinations thereof,
wherein the gathering system, the pipeline transmission system, the distribution system, or combinations thereof comprise one or more flow lines comprising a plurality of polyvinylidene fluoride (PVDF) pipe segments having a nominal pipe size of equal to or greater than 2 inches and equal to or less than 36 inches, wherein the processed fluid is natural gas and wherein the pipeline transmission system, the distribution system, or both comprises PVDF pipe segments having an SDR of 7 and a maximum operating pressure (MOP) of 666 psig, an SDR of 9 and a MOP of 500, an SDR of 11 and a MOP of 400, an SDR of 17 and a MOP of 250, an SDR of 21 and a MOP of 200, or a SDR of 26 and a MOP of 160, wherein the MOP is determined according to the equation:

$$MOP=[2(HDB)(DF)/(SDR-1)],$$

where MOP is maximum operating pressure in psig, HDB is hydrostatic design basis in psi as determined in accordance with ASTM Test Method D2837 at a temperature of 73° F.=5000 psi, DF is the deign factor=0.4 for regulated natural gas distribution systems, and SDR is standard dimension ratio which is the outside diameter of the pipe segments in inches divided by the pipe segment minimum wall thickness in inches, and wherein the PVDF pipe segments consist essentially of PVDF, or both.

19. The method of claim 11 wherein the one or more wellsite processing units comprise a heater, a gas-liquid separator, or both.

20. The method of claim 11 wherein the produced gas comprises methane, water, and one or more corrosive compounds selected from the group consisting of hydrogen sulfide, carbon dioxide, and combinations thereof.

21. The method of claim 11 wherein the subterranean formation comprises shale and the wellhead is onshore.

22. The method of claim 15 wherein the one or more wellsite processing units comprise a heater, a gas-liquid separator, or both.

23. The method of claim 15 wherein the produced gas comprises methane, water, and one or more corrosive compounds selected from the group consisting of hydrogen sulfide, carbon dioxide, and combinations thereof.

24. The method of claim 15 wherein the subterranean formation comprises shale and the wellhead is onshore.

25. The method of claim 18 wherein the recovered fluid comprises methane, water, and one or more corrosive compounds selected from the group consisting of hydrogen sulfide, carbon dioxide, and combinations thereof, wherein the subterranean formation comprises shale, and wherein the wellhead is onshore.

* * * * *